US012726330B2

(12) United States Patent
Chen et al.

(10) Patent No.: US 12,726,330 B2
(45) Date of Patent: Sep. 1, 2026

(54) PRIVACY CALCULATION UNIT, ACCELERATION UNIT, SYSTEM ON CHIP, AND PRIVACY CALCULATION METHOD

(71) Applicant: Alibaba Innovation Private Limited, Singapore (SG)

(72) Inventors: Zhaohui Chen, Beijing (CN); Zhen Gu, Beijing (CN); Yanheng Lu, Shanghai (CN); Dimin Niu, Sunnyvale, CA (US); Ziyuan Liang, Hangzhou (CN); Qi'ao Jin, Hangzhou (CN); Fan Zhang, Hangzhou (CN); Yuan Xie, Sunnyvale, CA (US)

(73) Assignee: Alibaba Innovation Private Limited, Singapore (SG)

( * ) Notice: Subject to any disclaimer, the term of this patent is extended or adjusted under 35 U.S.C. 154(b) by 206 days.

(21) Appl. No.: 18/636,500

(22) Filed: Apr. 16, 2024

(65) Prior Publication Data

US 2024/0348422 A1 Oct. 17, 2024

(30) Foreign Application Priority Data

Apr. 17, 2023 (CN) ......................... 202310421294.4

(51) Int. Cl.
*H04L 9/00* (2022.01)
*G06F 21/60* (2013.01)
*H04L 9/40* (2022.01)

(52) U.S. Cl.
CPC ........... *H04L 9/008* (2013.01); *G06F 21/602* (2013.01); *H04L 63/0478* (2013.01)

(58) Field of Classification Search
CPC .... H04L 9/008; H04L 63/0478; G06F 21/602
See application file for complete search history.

(56) References Cited

U.S. PATENT DOCUMENTS 12,250,297 B1 * 3/2025 Falk ...................... H04L 9/0631
2014/0028404 A1 * 1/2014 Kihara ...................... H03K 3/84
331/78

(Continued)

*Primary Examiner* — David J Pearson
(74) *Attorney, Agent, or Firm* — Finnegan, Henderson, Farabow, Garrett & Dunner, LLP

(57) ABSTRACT

A privacy calculation unit includes a first calculation subunit, a storage subunit, and a communication subunit. The first calculation subunit includes circuitry to calculate first domain conversion ciphertexts sequentially. The storage subunit is configured to store the calculated first domain conversion ciphertexts received from the first calculation subunit. The first domain conversion ciphertext is an intermediate ciphertext when first to-be-converted data is converted from a first privacy-preserving computation domain to a second privacy-preserving computation domain. The communication subunit includes circuitry to send, in a process in which the first calculation subunit calculates a postorder first domain conversion ciphertext, a preorder first domain conversion ciphertext to a target privacy calculation unit other than the current privacy calculation unit, to enable the target privacy calculation unit to generate first converted data corresponding to the first to-be-converted data in the second privacy-preserving computation domain according to the preorder first domain conversion ciphertext.

20 Claims, 8 Drawing Sheets

(56) References Cited

U.S. PATENT DOCUMENTS

| | | | | |
|---|---|---|---|---|
| 2015/0372807 | A1* | 12/2015 | Khoyi | G06F 16/116 713/150 |
| 2019/0123894 | A1* | 4/2019 | Yuan | H04L 9/0819 |
| 2021/0376997 | A1* | 12/2021 | Lim | G06F 7/50 |
| 2023/0071782 | A1* | 3/2023 | Woodruff | G06F 21/6218 |
| 2023/0327856 | A1* | 10/2023 | Lu | H04L 9/0825 713/171 |

* cited by examiner

PRIVACY CALCULATION UNIT, ACCELERATION UNIT, SYSTEM ON CHIP, AND PRIVACY CALCULATION METHOD

CROSS-REFERENCE TO RELATED APPLICATIONS

The present application claims priority to and the benefits of Chinese Patent Application No. 202310421294.4, filed on Apr. 17, 2023, which is incorporated herein by reference in its entirety.

TECHNICAL FIELD

The present disclosure relates to the field of chip technologies, and in particular, to a privacy calculation unit, an acceleration unit, a system on chip, and a privacy calculation method.

BACKGROUND

To improve accuracy of a machine learning model, privacy-preserving machine learning (PPML) allows participants to cooperate in model training and inference processes by applying a privacy-preserving computation technology. Common privacy-preserving computation technologies include Secure Multi-party Computation (SMC), Homomorphic Encryption (HE), a Trusted Execution Environment (TEE), and the like.

Because each single privacy-preserving computation technology has its own disadvantage, a computation solution combining multiple privacy-preserving computation technologies is currently used in the privacy-preserving machine learning. An efficient privacy-preserving machine learning solution is formed by combining advantages of different privacy-preserving computation technologies.

However, the privacy-preserving machine learning solution formed based on multiple privacy-preserving computation solutions does not have support from special-purpose hardware, resulting in low efficiency of privacy-preserving machine learning.

SUMMARY

Embodiments of the present disclosure provide a privacy calculation unit. The privacy calculation unit includes: a first calculation subunit including circuitry configured to calculate a plurality of first domain conversion ciphertexts sequentially, wherein the first domain conversion ciphertext is an intermediate ciphertext when first to-be-converted data is converted from a first privacy-preserving computation domain to a second privacy-preserving computation domain; a storage subunit configured to store the calculated first domain conversion ciphertexts received from the first calculation subunit; and a communication subunit including circuitry configured to send, in a process in which the first calculation subunit calculates a postorder first domain conversion ciphertext, a preorder first domain conversion ciphertext to a target privacy calculation unit other than the current privacy calculation unit and to enable the target privacy calculation unit to generate first converted data corresponding to the first to-be-converted data in the second privacy-preserving computation domain according to the preorder first domain conversion ciphertext.

Embodiments of the present disclosure provide a privacy calculation method. The privacy calculation method is applied to a current privacy calculation unit and includes: calculating a plurality of first domain conversion ciphertexts sequentially, and storing the calculated first domain conversion ciphertexts, wherein the first domain conversion ciphertext is an intermediate ciphertext when first to-be-converted data is converted from a first privacy-preserving computation domain to a second privacy-preserving computation domain; and sending, in a process in which a postorder first domain conversion ciphertext is calculated, a preorder first domain conversion ciphertext to a target privacy calculation unit other than the current privacy calculation unit, to enable the target privacy calculation unit to generate first converted data corresponding to the first to-be-converted data in the second privacy-preserving computation domain according to the preorder first domain conversion ciphertext.

Embodiments of the present disclosure provide a non-transitory computer-readable storage medium. The non-transitory computer-readable storage medium stores a program that is executable by a device to cause the device to perform operations of a privacy calculation method, the operations including: calculating a plurality of first domain conversion ciphertexts sequentially, and storing the calculated first domain conversion ciphertexts, wherein the first domain conversion ciphertext is an intermediate ciphertext when first to-be-converted data is converted from a first privacy-preserving computation domain to a second privacy-preserving computation domain; and sending, in a process in which a postorder first domain conversion ciphertext is calculated, a preorder first domain conversion ciphertext to a target privacy calculation unit other than the current privacy calculation unit, to enable the target privacy calculation unit to generate first converted data corresponding to the first to-be-converted data in the second privacy-preserving computation domain according to the preorder first domain conversion ciphertext.

BRIEF DESCRIPTION OF THE DRAWINGS

To describe the technical solutions in the embodiments of the present disclosure or in the prior art more clearly, the following briefly describes accompanying drawings required for describing the embodiments or the prior art. The accompanying drawings in the following description show merely some embodiments of the present disclosure, and a person of ordinary skill in the art may still derive other drawings from these accompanying drawings.

DETAILED DESCRIPTION

Figure 1:
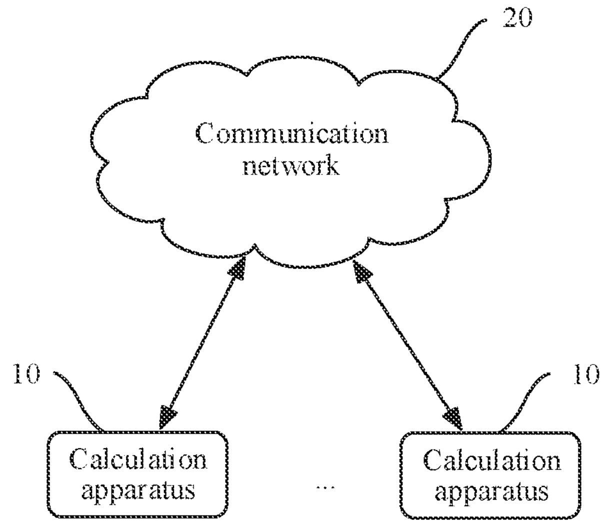
FIG. 1 is a schematic diagram of an example system according to some embodiments of the present disclosure.

Embodiments of the present disclosure will be described below, but the present disclosure is not merely limited to the embodiments described below. Some specified details are described in the following detailed description of the present disclosure. A person skilled in the art may also fully understand the present disclosure without the description of the details. To prevent essence of the present disclosure from being confused, well-known methods, procedures, and processes are not described in detail. In addition, the accompanying drawings are not necessarily drawn to scale.

In the embodiments of the present disclosure, the first calculation subunit calculates the plurality of first domain conversion ciphertexts sequentially, and stores the calculated first domain conversion ciphertexts into the storage subunit. In a process in which the first calculation subunit calculates the postorder first domain conversion ciphertext, the communication subunit sends the preorder first domain conversion ciphertext to the target privacy calculation unit, so that a calculation process of the postorder first domain conversion ciphertext at least partially overlaps with a sending process of the preorder first domain conversion ciphertext, and there is no need to wait for a preorder domain conversion ciphertext to be sent to a target calculation apparatus before starting to calculate a postorder domain conversion ciphertext, which reduces at least part of time of sending a domain conversion ciphertext to the target calculation apparatus. Therefore, for a privacy-preserving computation scenario, such as privacy-preserving machine learning, that requires a batch of privacy-preserving computation domain conversion, efficiency of privacy-preserving computation can be improved. Privacy-preserving computation is a series of information technologies that analyze and calculate data on the premise that a data provider does not disclose original data, ensuring that the data is available and invisible during a circulation and integration process.

For privacy-preserving computation, one or more privacy-preserving computation technologies, for example, the Secure Multi-party Computation (SMC), the Homomorphic Encryption (HE), and the Trusted Execution Environment (TEE), may be used.

Secure multi-party computation (SMC) is a privacy-preserving distributed computation technology in the field of cryptography. It is used for resolving a problem of a group of untrusted participants each holding secret data and collaboratively calculating a given function, and ensuring that the participants cannot obtain any information other than a calculation result while obtaining a correct calculation result. During the calculation process, the participants have complete control over the data they possess.

Secret sharing (SS) is one of solutions in the secure multi-party computation. The main idea is to divide a secret s into n parts, where n is a positive integer greater than or equal to 2. Each part is held as a sub-secret by a holder. The secret s can be reconstructed through sub-secrets held by more than or equal to t participants, while the secret s cannot be reconstructed by sub-secrets held by less than t participants, and no information about the secrets can be obtained, in which t is a positive integer less than or equal to n.

Homomorphic encryption (HE) is an encryption technology in which a ciphertext can be directly used for operation. A result of decrypting an output obtained by processing data on which homomorphic encryption is performed is consistent with an output obtained by using the same method to process unencrypted original data. When adding, subtracting, and aggregating the data on which homomorphic encryption is performed, plaintext data is not exposed.

A Trusted Execution Environment (TEE) is a secure area built in a processor through software and hardware methods, and ensures that confidentiality and integrity of a program and data that are loaded inside the processor are protected.

Different privacy-preserving computation technologies correspond to different privacy-preserving computation domains. A privacy-preserving computation domain is a set of data types divided according to the privacy-preserving computation technologies. For example, data processed through a secure multi-party computation technology is located in a secure multi-party computation domain, and data processed through a trusted execution environment technology is located in a trusted execution environment domain.

Domain conversion refers to processing of converting data in a specified privacy-preserving computation domain to data in another privacy-preserving computation domain, for example, processing of converting data in the secret sharing domain to data in the homomorphic encryption domain, or converting data in the homomorphic encryption domain to data in the secret sharing domain. Secret sharing domain is a data set including data that may be operated through a secret sharing technology. Homomorphic encryption domain is a data set including data that may be operated through a homomorphic encryption technology.

An example application environment according to some embodiments of the present disclosure will be discussed below.

In some embodiments of the present disclosure, a privacy calculation solution is provided. The entire privacy calculation solution is universal and can be used in various hardware devices, such as a data center, an artificial intelligence (AI) acceleration unit, a graphics processing unit (GPU), a general-purpose graphics processing unit (GPGPU), an Internet of Things (IoT) device for executing a deep learning model, or an embedded device, that involve privacy-preserving computation. The privacy calculation solution has nothing to do with hardware deployed on a calculation apparatus that executes the solution, but for illustrative description, the following is mainly described with a data center as an application scenario. A person skilled in the art shall understand that the embodiments of the present disclosure may also be applied to other application scenarios.

Example systems according to some embodiments of the present disclosure will be discussed below. FIG. 1 shows an example system applicable to the privacy calculation solution in some embodiments of the present disclosure. As shown in FIG. 1, the system may include a plurality of calculation apparatuses 10 and a communication network 20.

The calculation apparatus 10 can be any appropriate device, including but not limited to a distributed storage system device, a server cluster, a computing cloud server cluster, a mobile device, a tablet computer, a laptop computer, a desktop computer, a wearable computer, or a vehicle system, that is configured to store information, data, program, and/or any other appropriate type of content. In some embodiments, the calculation apparatus 10 may perform any appropriate function. For example, in some embodiments, the calculation apparatus 10 may be used for privacy calculation. As an optional example, in some embodiments, the calculation apparatus 10 may perform privacy calculation based on a privacy-preserving computation technology such as secret sharing, homomorphic encryption, or a trusted execution environment, and send a calculated ciphertext to another calculation apparatus 10. In some other embodiments, different calculation apparatuses 10 may perform privacy calculation based on different privacy-preserving computation technologies, or the same calculation apparatus 10 may perform privacy calculation based on a plurality of privacy-preserving computation technologies. For example, a calculation apparatus A performs privacy calculation based on the homomorphic encryption, and a calculation apparatus B performs privacy calculation based on the secret sharing, or the calculation apparatus A performs privacy calculation based on the secret sharing, and the calculation apparatus B performs privacy calculation based on the secret sharing and the homomorphic encryption. Because the plurality of privacy-preserving computation technologies are used for privacy calculation, data needs to be converted between different privacy-preserving computation domains during the privacy calculation. For example, a homomorphic ciphertext held by the calculation apparatus B is converted to a secret shared value, or a secret shared value held by the calculation apparatus A and the calculation apparatus B is converted to a homomorphic ciphertext held by the calculation apparatus B.

The communication network 20 can be any appropriate combination of one or more wired and/or wireless networks. For example, the communication network 20 can include any one or more of an Internet, an intranet, a wide area network (WAN), a local area network (LAN), a wireless network, a digital subscriber line (DSL) network, a frame relay network, an asynchronous transfer mode (ATM) network, a virtual private network (VPN), and/or any other appropriate communication network. The calculation apparatus 10 can be connected to the communication network 20 through one or more communication links. The communication link can be any communication link appropriate for transmitting data between the calculation apparatuses 10, such as a network link, a dial-up link, a wireless link, a hardwired link, any other appropriate communication link, or any appropriate combination of this type of link.

Embodiments of the present disclosure mainly focus on a process of the calculation apparatus 10 performing privacy calculation. The process of privacy calculation will be described in detail below.

Figure 2:
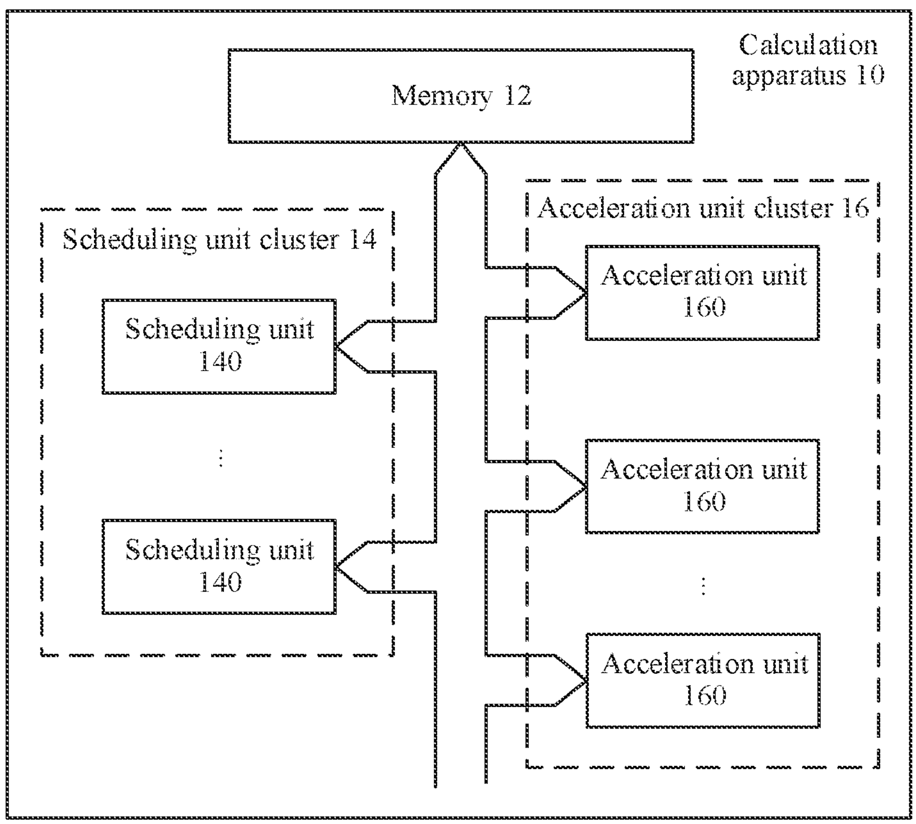
FIG. 2 is a block diagram of an example internal structure of a calculation apparatus according to some embodiments of the present disclosure.

Example calculation apparatuses according to some embodiments of the present disclosure will be discussed below. FIG. 2 is a block diagram of an internal structure of a calculation apparatus 10 (e.g., an electronic device or a system-on-chip) according to some embodiments of the present disclosure. As shown in FIG. 2, the calculation apparatus 10 includes a memory 12, a scheduling unit cluster 14, and an acceleration unit cluster 16 connected through a bus. The scheduling unit cluster 14 includes a plurality of scheduling units 140. The acceleration unit cluster 16 includes a plurality of acceleration units 160. In some embodiments of the present disclosure, the acceleration unit 160 is mainly a specialized processing unit designed for accelerating privacy calculation, and may be embodied as a central processing unit (CPU), a graphics processing unit (GPU), an infrastructure processing unit (IPU), an application specific integrated circuit (ASIC), a field programmable gate array (FPGA), a neural processing unit (NPU), or the like that is specially designed for privacy calculation. The scheduling unit 140 is a unit configured to schedule the acceleration unit 160, and to allocate a to-be-executed instruction sequence to each acceleration unit 160. The scheduling unit 140 can be in multiple forms, such as a central processing unit (CPU), an application specific integrated circuit (ASIC), a field programmable gate array (FPGA), etc.

The design of a conventional processor architecture makes the scheduling unit and storage occupy a large part of space in the architecture, while a calculation unit occupies insufficient space. Therefore, the design is very effective in logic control, but not efficient enough in large-scale parallel computation. Therefore, various specialized acceleration units have been developed to more effectively increase the computation speed for different functions and calculations in different fields. The acceleration unit provided in some embodiments of the present disclosure is a processing unit specifically for accelerating a privacy calculation speed, and can support privacy-preserving machine learning formed based on multiple privacy-preserving computation solutions and improve efficiency of the privacy-preserving machine learning.

The acceleration unit 160 is configured to accept scheduling of the scheduling unit 140. As shown in FIG. 2, the memory 12 stores data to be operated on, and the to-be-operated data are transmitted by one scheduling unit 140 to an acceleration unit 160. The scheduling unit 140 can send an address of the to-be-operated data in the memory 12 to the acceleration unit 160 in a form of instructions. When performing privacy calculation, the acceleration unit 160 directly addresses the to-be-operated data in the memory 12 and temporarily stores the to-be-operated data in an on-chip memory thereof, so that the acceleration unit 160 can operate the to-be-operated data. Some embodiments of the present disclosure mainly focus on a process of the acceleration unit 160 converting data between different privacy-preserving computation domains, and a conversion process of the data between different privacy-preserving computation domains will be described in detail below.

Figure 3:
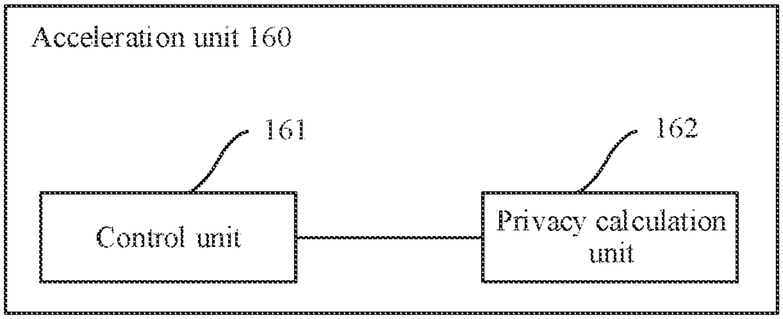
FIG. 3 is a block diagram of an example internal structure of an acceleration unit according to some embodiments of the present disclosure.

Example acceleration units according to some embodiments of the present disclosure will be discussed below. FIG. 3 is a block diagram of an internal structure of an acceleration unit 160 according to some embodiments of the present disclosure. As shown in FIG. 3, the acceleration unit 160 includes a control unit 161 and a privacy calculation unit 162. The control unit 161 includes circuitry configured to schedule operation of each subunit included in the privacy calculation unit 162, to implement data conversion between different privacy-preserving computation domains. The control unit 161 may adopt a plurality of forms, such as a central processing unit (CPU), an application specific integrated circuit (ASIC), and a field programmable gate array (FPGA).

Some embodiments of the present disclosure mainly focus on a process of the privacy calculation unit 162 converting data between different privacy-preserving computation domains. The following describes an interaction process between the subunits included in the privacy calculation unit 162, to describe a process of the control unit 161 scheduling each subunit in the privacy calculation unit 162 to perform data conversion. It is appreciated that at least a part of operation logic of each subunit included in the privacy calculation unit 162 is completed under scheduling of the control unit 161.

Figure 4:
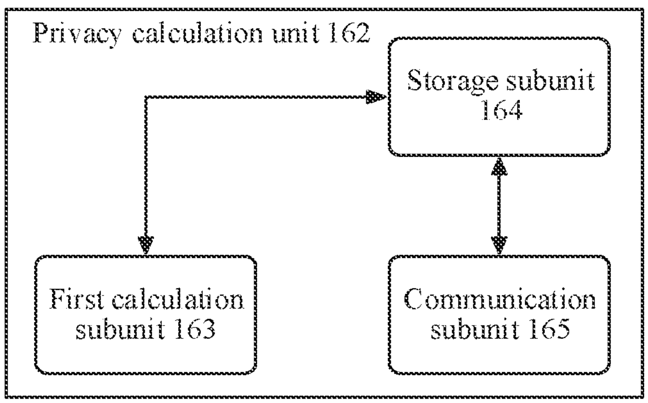
FIG. 4 is a block diagram of an example internal structure of a privacy calculation unit according to some embodiments of the present disclosure.

Example privacy calculation units according to some embodiments of the present disclosure will be discussed below. FIG. 4 is a block diagram of an internal structure of a privacy calculation unit 162 according to some embodiments of the present disclosure. As shown in FIG. 4, the privacy calculation unit 162 includes circuitry for a first calculation subunit 163, a storage subunit 164, and a communication subunit 165. The first calculation subunit 163 includes circuitry configured to calculate a plurality of first domain conversion ciphertexts sequentially, and store the calculated first domain conversion ciphertexts in the storage subunit 164. The first domain conversion ciphertext is an intermediate ciphertext when the first to-be-converted data is converted from a first privacy-preserving computation domain to a second privacy-preserving computation domain. The communication subunit 165 includes circuitry configured to send, in a process in which the first calculation subunit 163 calculates a postorder first domain conversion ciphertext, a preorder first domain conversion ciphertext to a target privacy calculation unit other than the current privacy calculation unit, to enable the target privacy calculation unit to generate first converted data corresponding to the first to-be-converted data in the second privacy-preserving computation domain according to the preorder first domain conversion ciphertext.

When the first to-be-converted data is converted from the first privacy-preserving computation domain to the second privacy-preserving computation domain, the first to-be-converted data needs to be converted into the first domain conversion ciphertext, and then the first converted data of the first to-be-converted data in the second privacy-preserving computation domain can be generated according to the first domain conversion ciphertext. In an application scenario of privacy-preserving computation such as privacy-preserving machine learning, the first to-be-converted data needs to be converted into the corresponding first converted data in batches, so that the first calculation subunit 163 may process a plurality of pieces of received first to-be-converted data sequentially, to obtain a plurality of corresponding first domain conversion ciphertexts, and store the obtained first domain conversion ciphertexts into the storage subunit 164. In an example, the first calculation subunit 163 processes the first to-be-converted data according to a reception order, to obtain the corresponding first domain conversion ciphertexts, and store the first domain conversion ciphertexts into the storage subunit 164 according to the reception order of the first to-be-converted data.

When data conversion is performed between different privacy-preserving computation domains, generally at least two calculation apparatuses are involved. In some embodiments of the present disclosure, an example is used for the description in which a conversion process involves two calculation apparatuses, but the present disclosure is not limited thereto. For example, there may be three or more calculation apparatuses participating in the conversion process, where any two calculation apparatuses with interaction may interact in an interaction manner provided in some embodiments of the present disclosure. In a process in which data conversion is performed between two privacy-preserving computation domains, a main step of a data conversion process is performed by the privacy calculation unit 162 included in the calculation apparatus. A current calculation apparatus includes the current privacy calculation unit, and a target calculation apparatus includes the target privacy calculation unit. The current privacy calculation unit calculates the first domain conversion ciphertext according to the first to-be-converted data in the first privacy-preserving computation domain, and sends the first domain conversion ciphertext to the target privacy calculation unit. The target privacy calculation unit generates the first converted data corresponding to the first to-be-converted data in the second privacy-preserving computation domain according to the first domain conversion ciphertext.

The first calculation subunit 163 calculates the plurality of first domain conversion ciphertexts sequentially, defines a first domain conversion ciphertext that is first calculated as the preorder first domain conversion ciphertext, and defines a first domain conversion ciphertext that is calculated afterwards as the postorder first domain conversion ciphertext. The preorder first domain conversion ciphertext and the postorder first domain conversion ciphertext may be first domain conversion ciphertexts that are continuously calculated, or may be first domain conversion ciphertexts that are not continuously calculated. For example, after the preorder first domain conversion ciphertext is calculated and before the postorder first domain conversion ciphertext is calculated, the first calculation subunit 163 further calculates another one or more first domain conversion ciphertexts. In a process in which the first calculation subunit 163 calculates the postorder first domain conversion ciphertext, the communication subunit 165 sends the preorder first domain conversion ciphertext to the target privacy calculation unit. In other words, the process in which the first calculation subunit 163 calculates the postorder first domain conversion ciphertext and a process in which the communication subunit 165 sends the preorder first domain conversion ciphertext to the target privacy calculation unit are performed in parallel.

The first calculation subunit 163 stores the calculated first domain conversion ciphertext into the storage subunit 164, so that the communication subunit 165 is configured to read the first domain conversion ciphertext from the storage subunit 164 and then configured to send the read first domain conversion ciphertext to the target privacy calculation unit. Taking a time when the first calculation subunit 163 starts to calculate the postorder first domain conversion ciphertext as a reference, the communication subunit 165 may read the preorder first domain conversion ciphertext from the storage subunit 164 before the time, or read the preorder first domain conversion ciphertext from the storage subunit 164 after the time, or read the preorder first domain conversion ciphertext from the storage subunit 164 at the time. This is not limited in embodiments of the present disclosure, as long as it is ensured that the time when the first calculation subunit 163 calculates the postorder first domain conversion ciphertext partially overlaps with a time when the communication subunit 165 sends the preorder first domain conversion ciphertext.

In some embodiments of the present disclosure, the first calculation subunit 163 calculates the plurality of first domain conversion ciphertexts sequentially, and stores the calculated first domain conversion ciphertexts into the storage subunit 164. In a process in which the first calculation subunit 163 calculates the postorder first domain conversion ciphertext, the communication subunit 165 sends the preorder first domain conversion ciphertext to the target privacy calculation unit, so that a calculation process of the postorder first domain conversion ciphertext at least partially overlaps with a sending process of the preorder first domain conversion ciphertext, and there is no need to wait for a preorder domain conversion ciphertext to be sent to a target calculation apparatus before starting to calculate a postorder domain conversion ciphertext, which reduces at least part of time of sending a domain conversion ciphertext to the target calculation apparatus. Therefore, for a privacy-preserving computation scenario, such as privacy-preserving machine learning, that requires a batch of privacy-preserving computation domain conversion, efficiency of privacy-preserving computation can be improved.

In some embodiments, the first privacy-preserving computation domain and the second privacy-preserving computation domain may include the following two combination forms: (i) the first privacy-preserving computation domain being a homomorphic encryption domain, and the second privacy-preserving computation domain being a secret sharing domain; and (ii) the first privacy-preserving computation domain being a secret sharing domain, and the second privacy-preserving computation domain being a homomorphic encryption domain.

For the foregoing combination form (i), the first privacy-preserving computation domain is a homomorphic encryption domain, and the second privacy-preserving computation domain is a secret sharing domain. In other words, the first to-be-converted data is data under the homomorphic encryption domain, and the first to-be-converted data under the homomorphic encryption domain needs to be converted into the first converted data under the secret sharing domain. A corresponding scenario is that a homomorphic ciphertext held by a calculation device B is converted into a secret shared value of a calculation device A and the calculation device B.

For the foregoing combination form (ii), the first privacy-preserving computation domain is a secret sharing domain, and the second privacy-preserving computation domain is a homomorphic encryption domain. In other words, the first to-be-converted data is data under the secret sharing domain, and the first to-be-converted data under the secret sharing domain needs to be converted into the first converted data under the homomorphic encryption domain. A corresponding scenario is that a secret shared value held by a calculation device A and a calculation device B is converted into a homomorphic ciphertext held by the calculation device B.

In some embodiments of the present disclosure, the privacy calculation unit 162 may be configured to convert data under the homomorphic encryption domain into data under the secret sharing domain, and may also be configured to convert the data under the secret sharing domain into the data under the homomorphic encryption domain. The privacy calculation unit is applicable to a privacy-preserving computation scenario using secret sharing and homomorphic encryption, implements bidirectional data conversion between the secret sharing domain and homomorphic encryption domain, and has strong applicability.

In some embodiments, when the first privacy-preserving computation domain is a homomorphic encryption domain, and the second privacy-preserving computation domain is a secret sharing domain, the first calculation subunit 163 may obtain a random shared value when calculating the first domain conversion ciphertext, and then calculate the first domain conversion ciphertext according to the random shared value and the first to-be-converted data. After the communication subunit 165 sends the first domain conversion ciphertext to the target privacy calculation unit, the target privacy calculation unit may decrypt the first domain conversion ciphertext based on a private key thereof, to obtain first converted data corresponding to the first to-be-converted data in the secret sharing domain, and use the obtained first converted data as an input, while the current privacy calculation unit uses the random shared value as an output.

Figure 5:
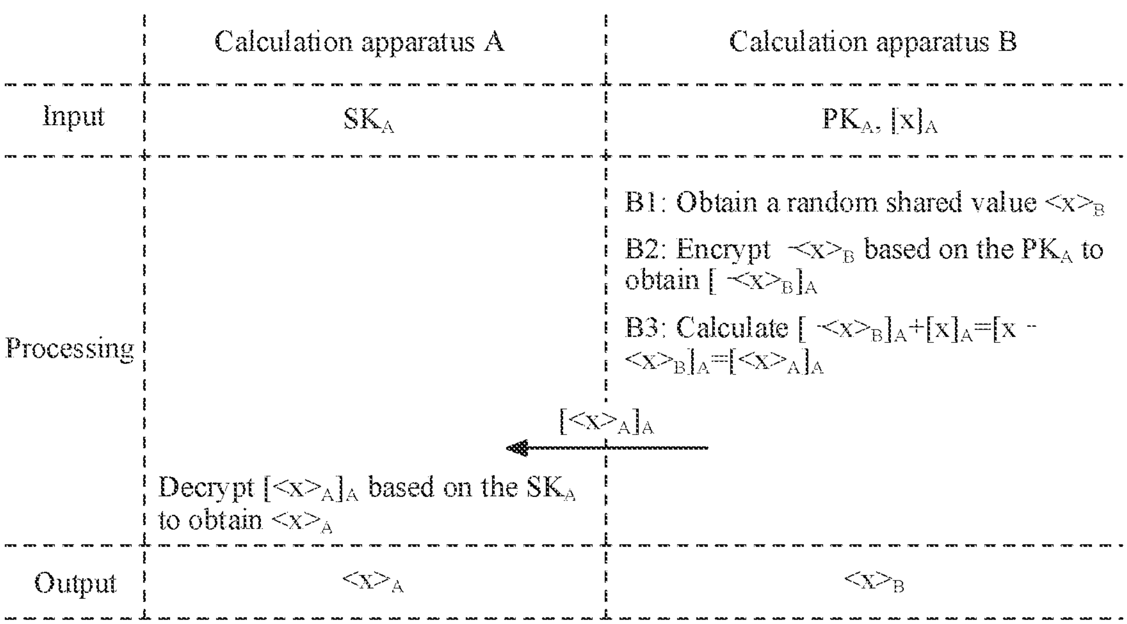
FIG. 5 is a schematic diagram of an example domain conversion process according to some embodiments of the present disclosure.

FIG. 5 is a schematic diagram of a domain conversion process according to some embodiments of the present disclosure. As shown in FIG. 5, a current privacy calculation unit is located in a calculation apparatus B, and a target privacy calculation unit is located in a calculation apparatus A. First to-be-converted data held by the calculation apparatus B is a homomorphic ciphertext $[x]_A$, an input of the calculation apparatus B is a public key $PK_A$ of the calculation apparatus A and the homomorphic ciphertext $[x]_A$, and an input of the calculation apparatus A is a private key $SK_A$ of the calculation apparatus A.

A first calculation subunit in the calculation apparatus B performs the following operations based on the input public key $PK_A$ and the homomorphic ciphertext $[x]_A$.

In step B1, a random shared value $<x>_B$ is obtained.

In step B2, $-<x>_B$ is encrypted based on the public key $PK_A$ of the calculation apparatus A, to obtain a homomorphic ciphertext $[-<x>_B]_A$.

In step B3, $[-<x>_B]_A+[x]_A=[x-<x>_B]_A=[<x>_A]_A$ is calculated to obtain a first domain conversion ciphertext $[<x>_A]_A$.

After calculating the first domain conversion ciphertext $[<x>_A]_A$, the first calculation subunit in the calculation apparatus B stores the first domain conversion ciphertext $[<x>_A]_A$ in a storage subunit in the calculation apparatus B, and then a communication subunit in the calculation apparatus B sends the first domain conversion ciphertext $[<x>_A]_A$ to the calculation apparatus A.

After receiving the first domain conversion ciphertext $[<x>_A]_A$, a communication subunit in the calculation apparatus A stores the first domain conversion ciphertext $[<x>_A]_A$ in a storage subunit in the calculation apparatus A, and then a first calculation subunit in the calculation apparatus A reads the first domain conversion ciphertext $[<x>_A]_A$ and encrypts the first domain conversion ciphertext $[<x>_A]_A$ based on the private key $SK_A$ of the calculation apparatus A, to obtain first converted data $<x>_A$.

The calculation apparatus A uses the first converted data $<x>_A$ as an output, and the calculation apparatus B uses the random shared value $<x>_B$ as an output. Through cooperation between privacy calculation units in the calculation apparatus A and the calculation apparatus B, the homomorphic ciphertext $[x]_A$ held by the calculation apparatus B is converted into a secret shared value $<x>_A$ held by the calculation apparatus A and a secret shared value $<x>_B$ held by the calculation apparatus B. Because the secret shared value $<x>_B$ is a random value, original data may be reconstructed according to the secret shared value $<x>_A$ and the secret shared domain $<x>_B$. However, the original data cannot be reconstructed according to only the secret shared value $<x>_A$ or only the secret shared value $<x>_B$, thereby avoiding leakage of the original data.

In some other embodiments, after performing step B1, the first calculation subunit in the calculation apparatus B may combine step B2 and step B3 into a step of calculating $[<x>_A]_A=-<x>_B+[x]_A$, to obtain the first domain conversion ciphertext $[<x>_A]_A$. In other words, when calculating the first domain conversion ciphertext $[<x>_A]_A$, the first calculation subunit in the calculation apparatus B may calculate the first domain conversion ciphertext $[<x>_A]_A$ based on a ciphertext of the random shared value $<x>_B$, or may calculate the first domain conversion ciphertext $[<x>_A]_A$ based on a plaintext of the random shared value $<x>_B$. Specifically, selection can be performed according to an actual requirement, ensuring that the privacy calculation unit has strong applicability.

It should be noted that, the domain conversion process is described in embodiments in FIG. 5 by an example in which a homomorphic addition operation is performed in the homomorphic encryption domain, but the operation form in the homomorphic encryption domain is not limited thereto. For example, homomorphic addition operations, homomorphic multiplication operations, or homomorphic multiplication and addition operations may be performed in the homomorphic encryption domain.

In some embodiments of the present disclosure, when data is converted from the homomorphic encryption domain to the secret sharing domain, the first calculation subunit 163 obtains the random shared value, and calculates the first domain conversion ciphertext according to the random shared value and the first to-be-converted data. After the communication subunit 165 sends the first domain conversion ciphertext to the target privacy calculation unit, the target privacy calculation unit may decrypt the first domain conversion ciphertext based on the private key thereof, to obtain the first converted data corresponding to the first to-be-converted data in the secret sharing domain. On the premise of implementing conversion of the data from the homomorphic encryption domain to the secret sharing domain, it is ensured that the original data is not leaked.

Figure 6:
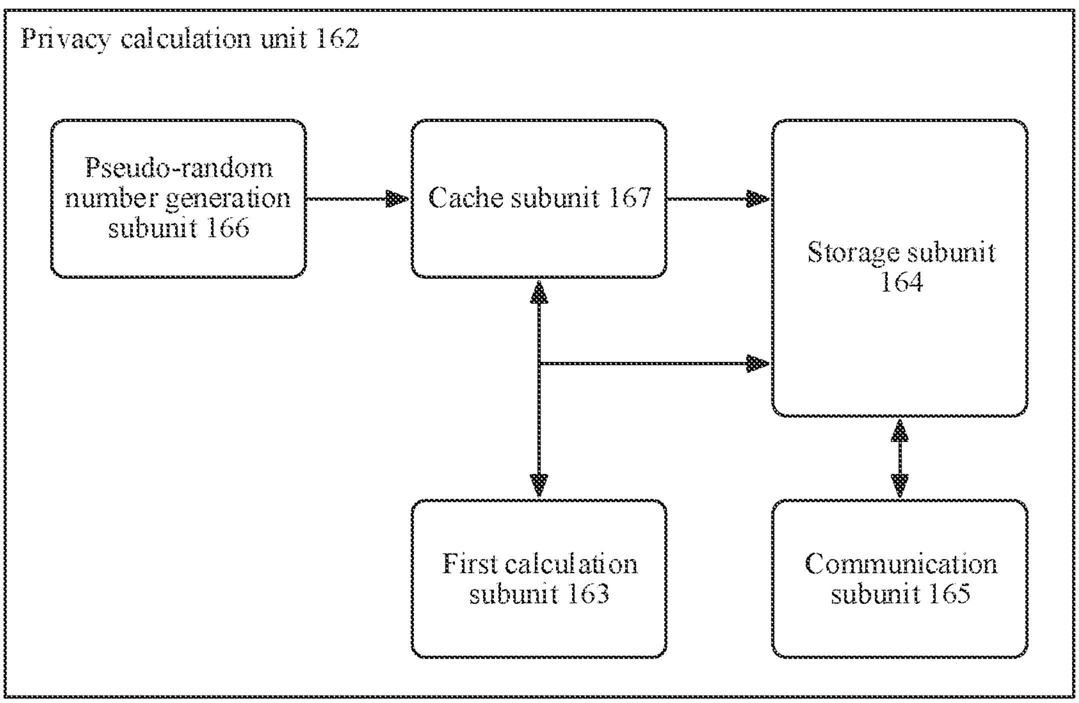
FIG. 6 is a block diagram of an example internal structure of a privacy calculation unit according to some other embodiments of the present disclosure.

FIG. 6 is a block diagram of an internal structure of a privacy calculation unit 162 according to some other embodiments of the present disclosure. As shown in FIG. 6, the privacy calculation unit 162 further includes circuitry for a pseudo-random number generation subunit 166 and a cache subunit 167. The pseudo-random number generation subunit 166 includes circuitry configured to generate a pseudo-random number according to a preset clock frequency and cache the generated pseudo-random number into the cache subunit 167. When calculating the first domain conversion ciphertext, the first calculation subunit 163 reads the pseudo-random number from the cache subunit 167 as the random shared value.

The pseudo-random number generation subunit 166 generates the pseudo-random number according to the preset clock frequency. The first calculation subunit 163 uses the pseudo-random number as the random shared value to calculate the first domain conversion ciphertext. A speed of the pseudo-random number generation subunit 166 generating the pseudo-random number is greater than or equal to a speed of the first calculation subunit 163 using the pseudo-random number.

The pseudo-random number generation subunit 166 may be a cryptographically secure pseudo-random number generator (CSPRNG). The cryptographically secure pseudo-random number generator may use a standard such as message digest algorithm MD5 or a secure hash algorithm 1 (SHA1) to convert variable-length information into a fixed-length 128-bit binary random number or a fixed-length 160-bit binary random number. The pseudo-random number is a random number sequence calculated by using a deterministic algorithm and is not truly random.

The cache subunit 167 is configured to cache the pseudo-random number generated by the pseudo-random number generation subunit 166, and the cache subunit 167 may be a static random-access memory (SRAM).

When a speed of the pseudo-random number generation subunit 166 storing the pseudo-random number in the cache subunit 167 is greater than a speed of the first calculation subunit 163 reading the pseudo-random number from the cache subunit 167, data overflow may occur in the cache subunit 167, but this does not affect normal progress of a domain conversion process, as long as it is ensured that the first calculation subunit 163 can read the pseudo-random number from the cache subunit 167 as the random shared value.

In some embodiments of the present disclosure, the pseudo-random number generation subunit 166 generates the pseudo-random number, and caches the generated pseudo-random number in the cache subunit 167. When calculating the first domain conversion ciphertext, the first calculation subunit 163 reads the pseudo-random number from the cache subunit 167 as the random shared value, and calculates the first domain conversion ciphertext based on the random shared value. Because it takes a long time to generate the pseudo-random number, for reading the pseudo-random number from the cache subunit 167 as the random shared value, the first calculation subunit 163 may immediately read the pseudo-random number after the preorder first domain conversion ciphertext is generated and start to calculate the postorder first domain conversion ciphertext without waiting for the pseudo-random number to be generated before starting to calculate the postorder first domain conversion ciphertext, thereby improving efficiency of domain conversion.

In some embodiments, after the preorder first domain conversion ciphertext is calculated, the first calculation subunit 163 starts to calculate the postorder first domain conversion ciphertext, and stores the preorder first domain conversion ciphertext into the storage subunit 164.

After calculating the first domain conversion ciphertext, the first calculation subunit 163 stores the first domain conversion ciphertext into the storage subunit 164, and then the communication subunit 165 reads the first domain conversion ciphertext from the storage subunit 164 and sends the read first domain conversion ciphertext to a target privacy calculation unit. After the first calculation subunit 163 calculates the preorder first domain conversion ciphertext, a circuit responsible for operation in the first calculation subunit 163 is in an idle state, and in this case, it can start to calculate the postorder first domain conversion ciphertext, and synchronously store the calculated preorder first domain conversion ciphertext into the storage subunit 164.

It should be understood that the first calculation subunit 163 starts to calculate the postorder first domain conversion ciphertext after calculating the preorder first domain conversion ciphertext, which means that the calculation of the postorder first domain conversion ciphertext can start after calculating the preorder first domain conversion ciphertext. However, the postorder first domain conversion ciphertext is not necessarily calculated immediately after the preorder first domain conversion ciphertext is calculated. There may be a time interval between the end time of the calculation of the preorder first domain conversion ciphertext and the start time of the calculation of the postorder first domain conversion ciphertext. It should be noted that, the preorder first domain conversion ciphertext and the postorder first domain conversion ciphertext in some embodiments of the present disclosure are first domain conversion ciphertexts that are continuously calculated.

Because the communication subunit 165 includes circuitry configured to send the first domain conversion ciphertexts to the target privacy calculation unit sequentially, and the target privacy calculation unit is configured to process the received first domain conversion ciphertexts sequentially, if it takes a long time for the communication subunit 165 to send the first domain conversion ciphertexts, or if it takes a long time for the target privacy calculation unit to process the first domain conversion ciphertext, efficiency of domain conversion is limited by sending efficiency and processing efficiency of the first domain conversion ciphertext. Even if the first calculation subunit 163 immediately starts to calculate the postorder first domain conversion ciphertext after calculating the preorder first domain conversion ciphertext, the efficiency of domain conversion is not improved. In this case, there may be the time interval between the end time of the calculation of the preorder first domain conversion ciphertext and the start time of the calculation of the postorder first domain conversion ciphertext, as long as it is ensured that the communication subunit 165 continuously sends the first domain conversion ciphertext or the target privacy calculation unit continuously processes the first domain conversion ciphertext.

If it takes a long time for the first calculation subunit 163 to calculate the first domain conversion ciphertext relative to a sending time and a processing time of the first domain conversion ciphertext, then the efficiency of domain conversion is limited by calculation efficiency of the first domain conversion ciphertext. In this case, the first calculation subunit 163 immediately starts to calculate the postorder first domain conversion ciphertext after calculating the preorder first domain conversion ciphertext, to maximize domain conversion efficiency.

Figure 7:
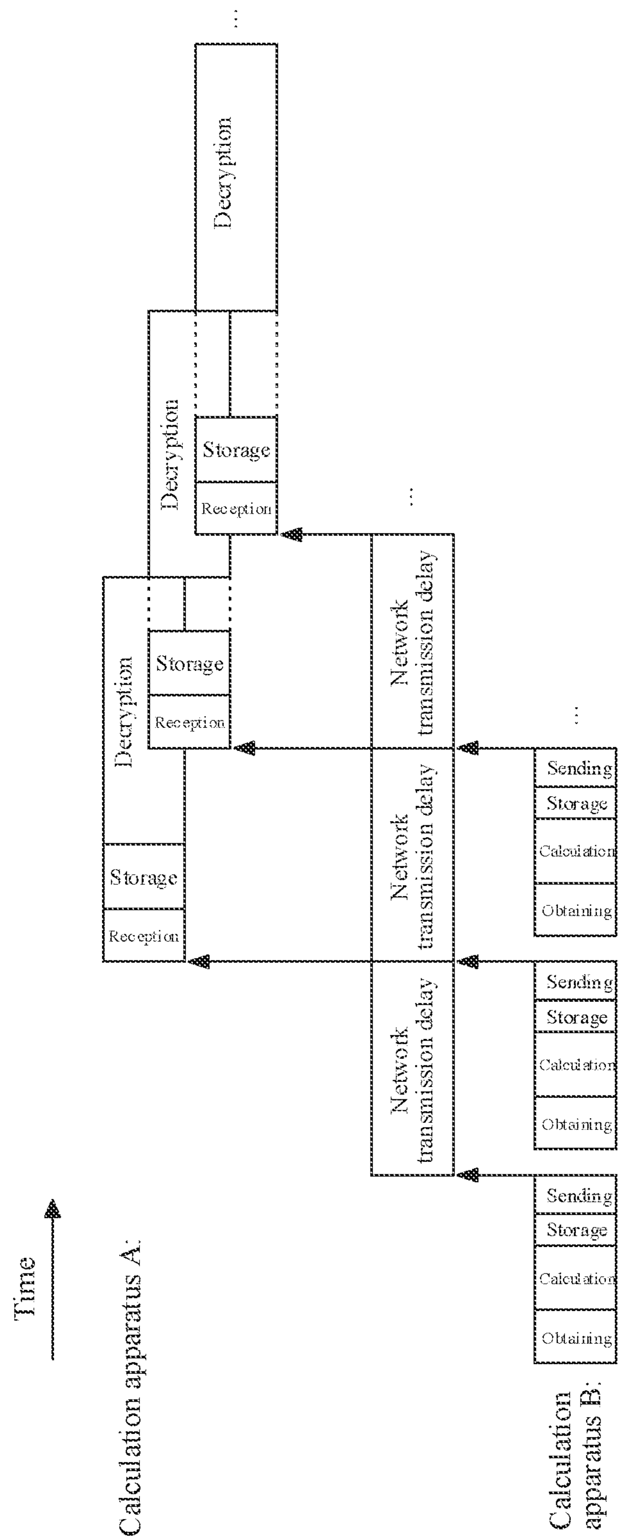
FIG. 7 is a schematic diagram of an example time sequence in a domain conversion process according to some embodiments of the present disclosure.

FIG. 7 is a schematic diagram of a time sequence in a domain conversion process according to some embodiments of the present disclosure. The domain conversion process corresponds to the domain conversion process in FIG. 5. As shown in FIG. 7, for each piece of first to-be-converted data, the calculation apparatus B performs processing of obtainment (e.g., obtaining a random shared value), calculation (e.g., calculating a first domain conversion ciphertext), storage (e.g., storing the first domain conversion ciphertext), and transmission (e.g., sending the first domain conversion ciphertext) sequentially. After the first domain conversion ciphertext is sent, the first domain conversion ciphertext reaches the calculation apparatus A after network transmission delay. Therefore, for each first domain conversion ciphertext, the calculation apparatus A performs processes of receipt (e.g., receiving the first domain conversion ciphertext), storage (e.g., storing the first domain conversion ciphertext), and decryption (e.g., decrypting the first domain conversion ciphertext).

The time for calculating the first domain conversion ciphertext is less than the network transmission delay for sending the first domain conversion ciphertext, and the network transmission delay for sending the first domain conversion ciphertext is less than the time for decrypting the first domain conversion ciphertext. Therefore, domain conversion efficiency is limited by the efficiency of the calculation apparatus A in decrypting the first domain conversion ciphertext. The calculation apparatus A is configured to decrypt the first domain conversion ciphertexts sequentially. To ensure the efficiency of domain conversion, after completing decryption of the preorder first domain conversion ciphertext, decryption of the postorder first domain conversion ciphertext can be immediately started. Before the decryption of the preorder first domain conversion ciphertext is completed, the receipt and storage of the postorder first domain conversion ciphertext are completed.

The calculation apparatus B continuously sends the first domain conversion ciphertexts to the calculation apparatus A sequentially. In other words, after the transmission of the preorder first domain conversion ciphertext is completed, the transmission of the postorder first domain conversion ciphertext can be started immediately. Correspondingly, there is a time interval between the end time of the calculation of the preorder first domain conversion ciphertext and the start time of obtaining a random shared value required for calculating the postorder first domain conversion ciphertext.

In some embodiments of the present disclosure, after calculating the preorder first domain conversion ciphertext, the first calculation subunit 163 can start to calculate the postorder first domain conversion ciphertext, and can synchronously store the preorder first domain conversion ciphertext into the storage subunit 164, so that the network transmission delay of the communication subunit 165 sending the preorder first domain conversion ciphertext at least partially overlaps with the time of the first calculation subunit 163 calculating the postorder first domain conversion ciphertext, thereby improving the efficiency of the domain conversion and privacy-preserving computation.

In some embodiments, when the first privacy-preserving computation domain is a secret sharing domain, and the second privacy-preserving computation domain is a homomorphic encryption domain, the first calculation subunit 163 can read the first to-be-converted data from the storage subunit 164 when calculating the first domain conversion ciphertext, and then perform homomorphic encryption on the first to-be-converted data based on a public key of the current privacy calculation unit, to obtain the first domain conversion ciphertext. After the communication subunit 165 sends the first domain conversion ciphertext to a target privacy calculation unit, the target privacy calculation unit can calculate the first converted data corresponding to the first to-be-converted data and the second to-be-converted data in the homomorphic encryption domain according to the first domain conversion ciphertext and a first homomorphic ciphertext obtained by the homomorphic encryption performed on the second to-be-converted data corresponding to the first to-be-converted data based on the public key of the current privacy calculation unit, and use the first converted data as an output, while the current privacy calculation unit has no output.

Figure 8:
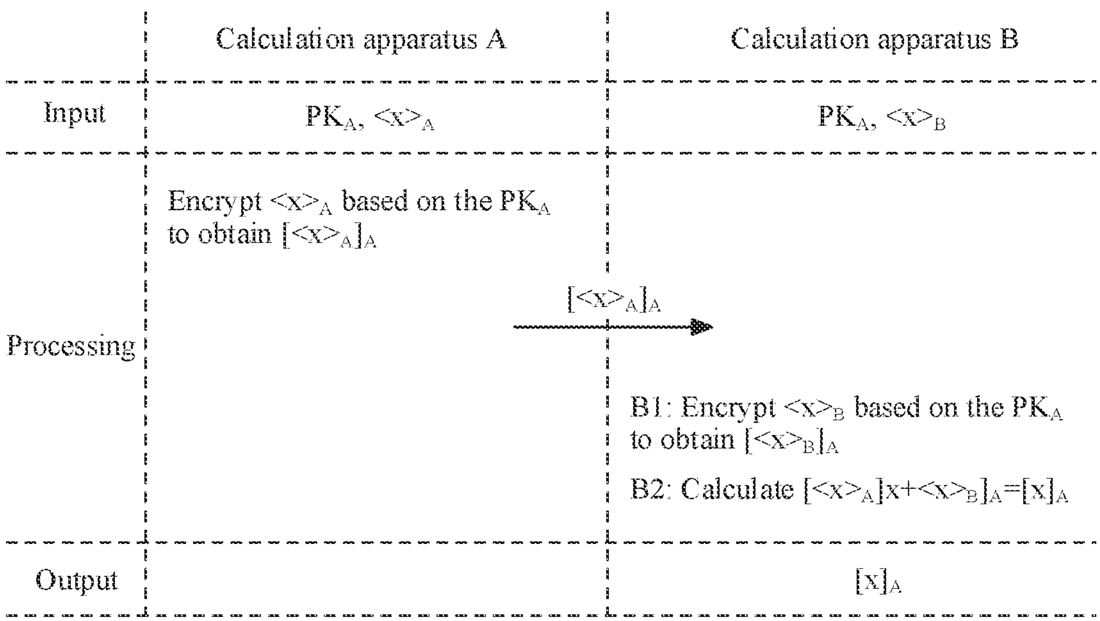
FIG. 8 is a schematic diagram of an example domain conversion process according to some other embodiments of the present disclosure.

FIG. 8 is a schematic diagram of a domain conversion process according to some other embodiments of the present disclosure. As shown in FIG. 8, a current privacy calculation unit is located in a calculation apparatus A, and a target privacy calculation unit is located in a calculation apparatus B. The first to-be-converted data held by the calculation apparatus A is a secret shared value $\langle x \rangle_A$, the second to-be-converted data held by the calculation apparatus B is a secret shared value $\langle x \rangle_B$, and the secret shared value $\langle x \rangle_A$ and the secret shared value $\langle x \rangle_B$ are two secret shared values corresponding to the same original data. An input of the calculation apparatus A is a public key $PK_A$ of the calculation apparatus A and the secret shared value $\langle x \rangle_A$, and an input of the calculation apparatus B is the public key $PK_A$ of the calculation apparatus A and the secret shared value $\langle x \rangle_B$.

The first calculation subunit in the calculation apparatus A performs homomorphic encryption on the secret shared value $\langle x \rangle_A$ based on the public key $PK_A$ of the calculation apparatus A, to obtain the first domain conversion ciphertext $[\langle x \rangle_A]_A$. The first domain conversion ciphertext $[\langle x \rangle_A]_A$ is a homomorphic ciphertext. After calculating the first domain conversion ciphertext $[\langle x \rangle_A]_A$, the first calculation subunit in the calculation apparatus A stores the first domain conversion ciphertext $[\langle x \rangle_A]_A$ in the storage subunit in the calculation apparatus A, and then the communication subunit in the calculation apparatus A sends the first domain conversion ciphertext $[<x>_A]_A$ to the calculation apparatus B.

After receiving the first domain conversion ciphertext $[<x>_A]_A$, the first calculation subunit in the calculation apparatus B performs the following operations based on the inputted public key $PK_A$ and the secret shared value $<x>_B$.

In step B1, the secret shared value $<x>_B$ is encrypted based on the public key $PK_A$ of the calculation apparatus A, to obtain the first homomorphic ciphertext $[<x>_B]_A$.

In step B2, $[<x>_A]_A+[<x>_B]_A=[x]_A$ is calculated, to obtain the first converted data $[x]_A$. The first converted data $[x]_A$ is a homomorphic ciphertext.

The calculation apparatus A and the calculation apparatus B each hold a secret shared value. Through cooperation between privacy calculation units in the calculation apparatus A and the calculation apparatus B, the secret shared values held by the two calculation apparatuses are converted into the homomorphic ciphertext $[x]_A$ held by the calculation apparatus B. Both the first domain conversion ciphertext $[<x>_A]_A$ and the first converted data $[x]_A$ are homomorphic ciphertexts. The first to-be-converted data $<x>_A$ and the second to-be-converted data $<x>_B$ under the secret sharing domain are converted into the first converted data $[x]_A$ under the homomorphic encryption domain, avoiding leakage of original data.

It should be noted that, the domain conversion process is described in embodiments in FIG. 8 by an example in which a homomorphic addition operation is performed in the homomorphic encryption domain, but the operation form in the homomorphic encryption domain is not limited thereto. For example, homomorphic addition operations, homomorphic multiplication operations, or homomorphic multiplication and addition operations may be performed in the homomorphic encryption domain.

In some embodiments of the present disclosure, when data is converted from the secret sharing domain to the homomorphic encryption domain, the first calculation subunit 163 encrypts the first to-be-converted data based on the public key of the current privacy calculation unit, to obtain the first domain conversion ciphertext. After the communication subunit 165 sends the first domain conversion ciphertext to the target privacy calculation unit, the target privacy calculation unit encrypts the second to-be-converted data based on the public key of the current privacy calculation unit, to obtain the first homomorphic ciphertext, and calculates the first converted data corresponding to the first to-be-converted data and the second to-be-converted data under the homomorphic encryption domain according to the first homomorphic ciphertext and the first domain conversion ciphertext. On the premise of implementing conversion of the data from the secret sharing domain to the homomorphic encryption domain, it is ensured that the original data is not leaked.

In some embodiments, when the first privacy-preserving computation domain is a secret sharing domain, and the second privacy-preserving computation domain is a homomorphic encryption domain, the first calculation subunit 163 reads, before calculating the preorder first domain conversion ciphertext, the first to-be-converted data corresponding to the postorder first domain conversion ciphertext from the storage subunit 164, to start to calculate the postorder first domain conversion ciphertext after calculating the preorder first domain conversion ciphertext, and to store the preorder first domain conversion ciphertext into the storage subunit 164.

When calculating the first domain conversion ciphertext, the first calculation subunit 163 is configured to read the first to-be-converted data from the storage subunit 164 first, and then performs homomorphic encryption on the read first to-be-converted data, to obtain the first domain conversion ciphertext, and then stores the first domain conversion ciphertext into the storage subunit 164. The communication subunit 165 then reads the first domain conversion ciphertext from the storage subunit 164 and sends the read first domain conversion ciphertext to the target privacy calculation unit. After the first calculation subunit 163 calculates the preorder first domain conversion ciphertext, a circuit responsible for operation in the first calculation subunit 163 is in an idle state, and in this case, it can start to calculate the postorder first domain conversion ciphertext, and synchronously store the calculated preorder first domain conversion ciphertext into the storage subunit 164.

The first calculation subunit 163 includes circuitry configured to perform homomorphic encryption on the first to-be-converted data, to obtain the first domain conversion ciphertext. Because performing homomorphic encryption on the first to-be-converted data takes a long time and becomes a key step limiting domain conversion efficiency, before calculating the preorder first domain conversion ciphertext, the first calculation subunit 163 reads the first to-be-converted data corresponding to the postorder first domain conversion ciphertext from the storage subunit 164. After the first calculation subunit 163 calculates the preorder first domain conversion ciphertext, the first calculation subunit 163 immediately starts to calculate the postorder first domain conversion ciphertext. In other words, the calculation process of the postorder first domain conversion ciphertext and the storage and transmission processes of the preorder first domain conversion ciphertext are synchronously performed, which reduces the time in storing and sending the preorder first domain conversion ciphertext, and reduces the time in reading the first to-be-converted data corresponding to the postorder first domain conversion ciphertext, so that the domain conversion efficiency can be improved.

It is to be noted that, in some embodiments of the present disclosure, the preorder first domain conversion ciphertext and the postorder first domain conversion ciphertext are the first domain conversion ciphertexts being calculated continuously.

Figure 9:
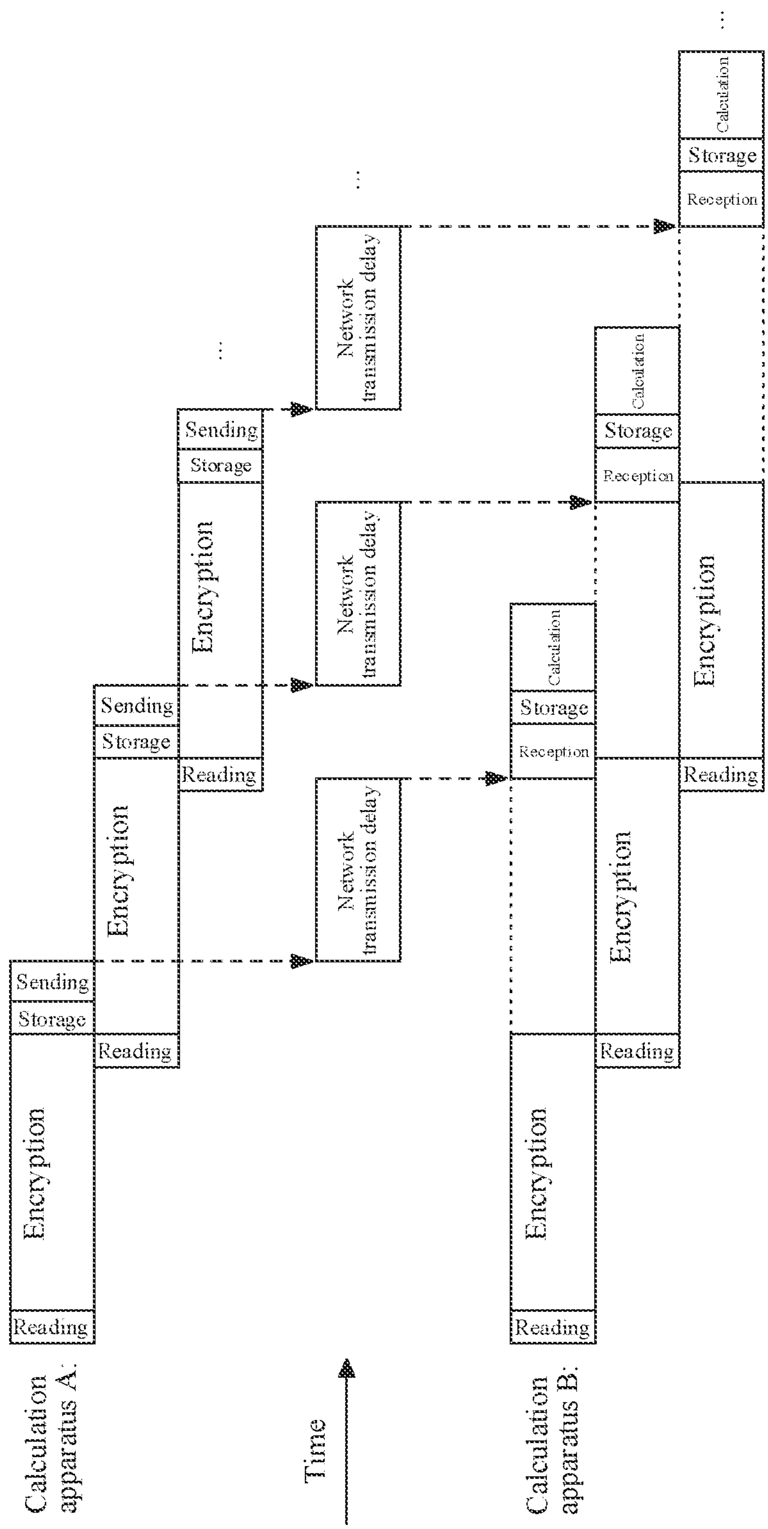
FIG. 9 is a schematic diagram of an example time sequence in a domain conversion process according to some other embodiments of the present disclosure.

FIG. 9 is a schematic diagram of a time sequence in a domain conversion process according to some other embodiments of the present disclosure. The domain conversion process corresponds to the domain conversion process shown in FIG. 8. As shown in FIG. 9, for each piece of first to-be-converted data, the calculation apparatus A performs the process of reading (e.g., reading the first to-be-converted data), encryption (e.g., performing homomorphic encryption on the first to-be-converted data to obtain the first domain conversion ciphertext), storage (e.g., storing the first domain conversion ciphertext into the storage subunit), and transmission (e.g., sending the first domain conversion ciphertext to the calculation apparatus B) sequentially. After the first domain conversion ciphertext is sent, the first domain conversion ciphertext reaches the calculation apparatus B after network transmission delay. For each piece of the second to-be-converted data, the calculation apparatus B performs processing of reading (e.g., reading the second to-be-converted data), encryption (e.g., performing homomorphic encryption on the second to-be-converted data to obtain the first homomorphic ciphertext), receipt (e.g., receiving a corresponding first domain conversion ciphertext), storage (e.g., storing the first domain conversion ciphertext into the storage subunit), and calculation (e.g., calculating the first converted data) sequentially.

For the calculation apparatus A, the time for performing reading, encryption, storage, and transmission is greater than the network transmission delay for sending the first domain conversion ciphertext, so that domain conversion efficiency is limited by the efficiency of the calculation apparatus A in operations of reading, encryption, storage, and transmission. The calculation apparatus A pre-reads, before calculating the preorder first domain conversion ciphertext, the first to-be-converted data for calculating the postorder first domain conversion ciphertext, and immediately starts to calculate the postorder first domain conversion ciphertext after calculating the preorder first domain conversion ciphertext. The time for storing and sending the preorder first domain conversion ciphertext overlaps with the time for calculating the postorder first domain conversion ciphertext, and the time for reading the first to-be-converted data for calculating the postorder first domain conversion ciphertext overlaps with the time for calculating the preorder first domain conversion ciphertext. For a privacy-preserving computation scenario, such as privacy-preserving machine learning, that requires a batch of privacy-preserving computation domain conversion, at least the time taken in operations of reading, storage, and transmission performed by the calculation apparatus A may be partially reduced, thereby improving the efficiency of the privacy-preserving computation.

In some embodiments of the present disclosure, the first calculation subunit 163 reads, before calculating the preorder first domain conversion ciphertext, the first to-be-converted data for calculating the postorder first domain conversion ciphertext from the storage subunit 164, and may immediately start to calculate the postorder first domain conversion ciphertext after calculating the preorder first domain conversion ciphertext, and may synchronously store the preorder first domain conversion ciphertext into the storage subunit 164. When the first calculation subunit 163 calculates the postorder first domain conversion ciphertext, the communication subunit 165 may synchronously send the preorder first domain conversion ciphertext, which reduces the time for reading the first to-be-converted data, storing the preorder first domain conversion ciphertext, and sending the preorder first domain conversion ciphertext, so that the efficiency of domain conversion and privacy-preserving computation can be improved.

In a privacy calculation system including a plurality of privacy calculation units 162, a domain conversion ciphertext is transferred between the privacy calculation units 162, to implement conversion of data between different privacy-preserving computation domains. Therefore, for any privacy calculation unit 162, the privacy calculation unit 162 can not only be used as a source privacy calculation unit to send a domain conversion ciphertext to a target privacy calculation unit, but also be used as a target privacy calculation unit to receive a domain conversion ciphertext sent by a source privacy calculation unit. In the foregoing embodiments, a current privacy computing unit is used as the source privacy computing unit, to describe the process of the privacy calculation unit 162 calculating and sending the domain conversion ciphertext. In the following paragraphs, the current privacy calculation unit is used as the target privacy calculation unit, to describe the process of the privacy calculation unit 162 receiving the domain conversion ciphertext and obtaining the converted data according to the domain conversion ciphertext.

In some embodiments, when converting data from the homomorphic encryption domain to the secret sharing domain, the communication subunit 165 can receive the second domain conversion ciphertext from the first source privacy calculation unit other than the current privacy calculation unit, and store the second domain conversion ciphertext into the storage subunit 164. The second domain conversion ciphertext is an intermediate ciphertext when third to-be-converted data is converted from the homomorphic encryption domain to the secret sharing domain, and the second domain conversion ciphertext is calculated by the first source privacy calculation unit based on a generated random shared value and the third to-be-converted data. The first calculation subunit 163 can decrypt the second domain conversion ciphertext based on a private key of the current privacy calculation unit, to obtain second converted data corresponding the third to-be-converted data in the secret sharing domain.

For the specific process of the first source privacy calculation unit calculating and sending the second domain conversion ciphertext, the reference may be made to the description for FIG. 5 in the foregoing embodiments. Specifically, the reference may be made to the processes performed by the calculation apparatus B, and thus details are not repeated herein.

For the specific process of the first calculation subunit 163 decrypting the second domain conversion ciphertext to obtain the second converted data, the reference may be made to the description for FIG. 5 in the foregoing embodiments. Specifically, the reference may be made to the processes performed by the calculation apparatus A, and thus details are not repeated herein.

In some embodiments of the present disclosure, when data is converted from the homomorphic encryption domain to the secret sharing domain, after the communication subunit 165 receives the second domain conversion ciphertext, the first calculation subunit 163 decrypts the second domain conversion ciphertext based on the private key of the current privacy calculation unit, to obtain the second converted data corresponding the third to-be-converted data in the secret sharing domain. On the premise of implementing conversion of the data from the homomorphic encryption domain to the secret sharing domain, it is ensured that the original data is not leaked.

In some embodiments, when the data is converted from the homomorphic encryption domain to the secret sharing domain, the first calculation subunit 163 reads, before completing decryption on a preorder second domain conversion ciphertext, a postorder second domain conversion ciphertext from the storage subunit 164, to start to decrypt the postorder second domain conversion ciphertext after completing the decryption on the preorder second domain conversion ciphertext.

As shown in FIG. 7, corresponding to some embodiments, the current privacy calculation unit is located in the calculation apparatus A, and the first source privacy calculation unit is located in the calculation apparatus B. The calculation apparatus A receives second domain conversion ciphertexts sequentially, and stores the received second domain conversion ciphertexts into the storage subunit 164, so that the first calculation subunit 163 reads the second domain conversion ciphertexts from the storage subunit 164 sequentially, and decrypts the second domain conversion ciphertext, to obtain corresponding second converted data. In the process of decrypting the preorder second domain conversion ciphertext, the first calculation subunit 163 synchronously reads the postorder second domain conversion ciphertext from the storage subunit 164. When the decryption of the preorder second domain conversion ciphertext is completed, the first calculation subunit has read the postorder second domain conversion ciphertext and may immediately start to decrypt the postorder second domain conversion ciphertext.

In some embodiments of the present disclosure, when converting data from the homomorphic encryption domain to the secret sharing domain, the first calculation subunit 163 reads the postorder second domain conversion ciphertext before completing the decryption of the preorder second domain conversion ciphertext, and may immediately start to decrypt the postorder second domain conversion ciphertext after completing the decryption of the preorder second domain conversion ciphertext, so that the process of receipt, storage, and reading of the postorder second domain conversion ciphertext overlaps with the process of decrypting the preorder second domain conversion ciphertext, which reduces the time for receiving, storing, and reading the postorder second domain conversion ciphertext, so that the efficiency of converting data from the homomorphic encryption domain to the secret sharing domain can be improved.

In some embodiments, when converting the data from the secret sharing domain to the homomorphic encryption domain, the communication subunit 165 can receive a third domain conversion ciphertext from a second source privacy calculation unit other than the current privacy calculation unit, and store the third domain conversion ciphertext into the storage subunit 164. The third domain conversion ciphertext is an intermediate ciphertext when fourth to-be-converted data and corresponding fifth to-be-converted data are converted from the secret sharing domain to the homomorphic encryption domain, and the third domain conversion ciphertext is obtained through homomorphic encryption performed by the second source privacy calculation unit on the fourth to-be-converted data based on a public key of the second source privacy calculation unit. The first calculation subunit 163 can read the third domain conversion ciphertext and the fifth to-be-converted data from the storage subunit 164, and perform homomorphic encryption on the fifth to-be-converted data based on a public key of the current privacy calculation unit, to obtain a second homomorphic ciphertext, and calculate third converted data corresponding to the fourth to-be-converted data and the fifth to-be-converted data in the homomorphic encryption domain according to the second homomorphic ciphertext and the third domain conversion ciphertext.

For the specific process of the second source privacy calculation unit calculating and sending the third domain conversion ciphertext, the reference may be made to the description for FIG. 8 in the foregoing embodiments. Specifically, the reference may be made to the processes performed by the calculation apparatus A, and thus details are not repeated herein.

For the specific process of the first calculation subunit 163 calculating the third converted data, the reference may be made to the description for FIG. 8 in the foregoing embodiments. Specifically, the reference may be made to the processes performed by the calculation apparatus B, and thus details are not repeated herein.

In some embodiments of the present disclosure, when data is converted from the secret sharing domain to the homomorphic encryption domain, after the communication subunit 165 receives the third domain conversion ciphertext, the first calculation subunit 163 performs homomorphic encryption on the fifth to-be-converted data based on the public key of the current privacy calculation unit, to obtain the second homomorphic ciphertext, thereby calculating the third converted data corresponding to the fourth to-be-converted data and the fifth to-be-converted data in the homomorphic encryption domain according to the second homomorphic ciphertext and the third domain conversion ciphertext. Because the fourth to-be-converted data and the fifth to-be-converted data are secret shared values under the secret sharing domain, and the third domain conversion ciphertext is a homomorphic ciphertext under homomorphic encryption, on the premise of implementing the conversion of data from the secret sharing domain to the homomorphic encryption domain, it is ensured that the original data is not leaked.

In some embodiments, when the data is converted from the secret sharing domain to the homomorphic encryption domain, before the communication subunit 165 receives the third domain conversion ciphertext, the first calculation subunit 163 reads the fifth to-be-converted data from the storage subunit 164, and performs homomorphic encryption on the fifth to-be-converted data based on the public key of the current privacy calculation unit, to obtain the second homomorphic ciphertext.

As shown in FIG. 9, corresponding to some embodiments, the current privacy calculation unit is located in the calculation apparatus B, and the second source privacy calculation unit is located in the calculation apparatus A. Because it takes a long time to perform homomorphic encryption on the fifth to-be-converted data, before receiving the third domain conversion ciphertext, the calculation apparatus B pre-reads the fifth to-be-converted data, and performs homomorphic encryption on the fifth to-be-converted data, to obtain the corresponding second homomorphic ciphertext, so that after receiving the third domain conversion ciphertext, the calculation apparatus B may start to calculate the third converted data based on the third domain conversion ciphertext and the second homomorphic ciphertext.

In one example, when the current privacy calculation unit reads the fifth to-be-converted data, the second source privacy calculation unit synchronously reads the fourth to-be-converted data, and when the current privacy calculation unit performs homomorphic encryption on the fifth to-be-converted data, the second source privacy calculation unit synchronously performs homomorphic encryption on the fourth to-be-converted data.

In some embodiments of the present disclosure, when the data is converted from the secret sharing domain to the homomorphic encryption domain, before the communication subunit 165 receives the third domain conversion ciphertext, the first calculation subunit 163 pre-reads the fifth to-be-converted data, and performs homomorphic encryption on the fifth to-be-converted data, to obtain the second homomorphic ciphertext, so that after the communication subunit 165 receives the third domain conversion ciphertext, the first calculation subunit 163 may start to calculate the third converted data according to the third domain conversion ciphertext and the second homomorphic ciphertext, which reduces the time for reading and encrypting the fifth to-be-converted data, so that the efficiency of converting data from the secret sharing domain to the homomorphic encryption domain may be improved.

It should be noted that, concepts such as "first" and "second" mentioned in the embodiments of the present disclosure are only used for distinguishing different data, devices, modules, or units, and are not used for limiting a sequence or interdependence relationship of functions performed by the data, devices, modules, or units. For example, the first source privacy calculation unit and the second source privacy calculation unit may be the same privacy calculation unit. In a scenario of converting data from the homomorphic encryption domain to the secret sharing domain, a privacy calculation unit that generates a domain conversion ciphertext is referred to as the first source privacy calculation unit. In a scenario of converting data from the secret sharing domain to the homomorphic encryption domain, the privacy calculation unit that generates the domain conversion ciphertext is referred to as the second source privacy calculation unit.

Figure 10:
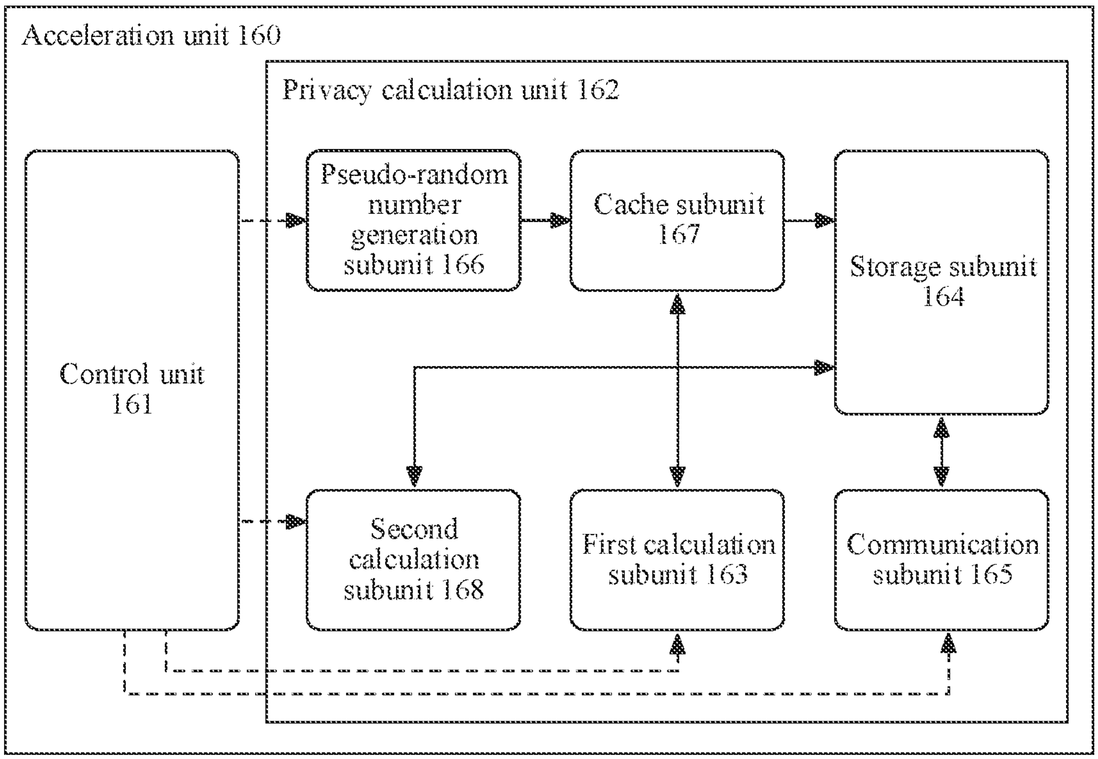
FIG. 10 is a schematic diagram of an example acceleration unit according to some other embodiments of the present disclosure.

FIG. 10 is a block diagram of an internal structure of an acceleration unit 160 according to some other embodiments of the present disclosure. As shown in FIG. 10, the privacy calculation unit 162 further includes a second calculation subunit 168. The first calculation subunit 163 may perform operations on data in the homomorphic encryption domain, and the second calculation subunit 168 may perform operations on data in the secret sharing domain.

In some embodiments of the present disclosure, during performing the privacy-preserving computation, not only operations in the homomorphic encryption domain are involved, but also operations in the secret sharing domain are involved. The operations in the homomorphic encryption domain include the homomorphic addition and multiplication operation. The operations in the secret sharing domain includes the integer operation. The first calculation subunit 163 is used for the homomorphic addition and multiplication operations in the homomorphic encryption domain, and the second calculation subunit is used for the integer operation in the secret sharing domain, to ensure that the privacy calculation unit 162 can normally perform the privacy-preserving computation.

In some embodiments, as shown in FIG. 10, the control unit 161 is connected to the pseudo-random number generation subunit 166, the first calculation subunit 163, the second calculation subunit 168, and the communication subunit 165 through control buses. The control buses are shown as dotted lines in the figure. The control unit 161 schedules the pseudo-random number generation subunit 166, the first calculation subunit 163, the second calculation subunit 168, and the communication subunit 165 through the control buses, to ensure the normal operation of the privacy calculation unit 162.

Example privacy calculation methods according to some embodiments of the present disclosure will be discussed below.

Figure 11:
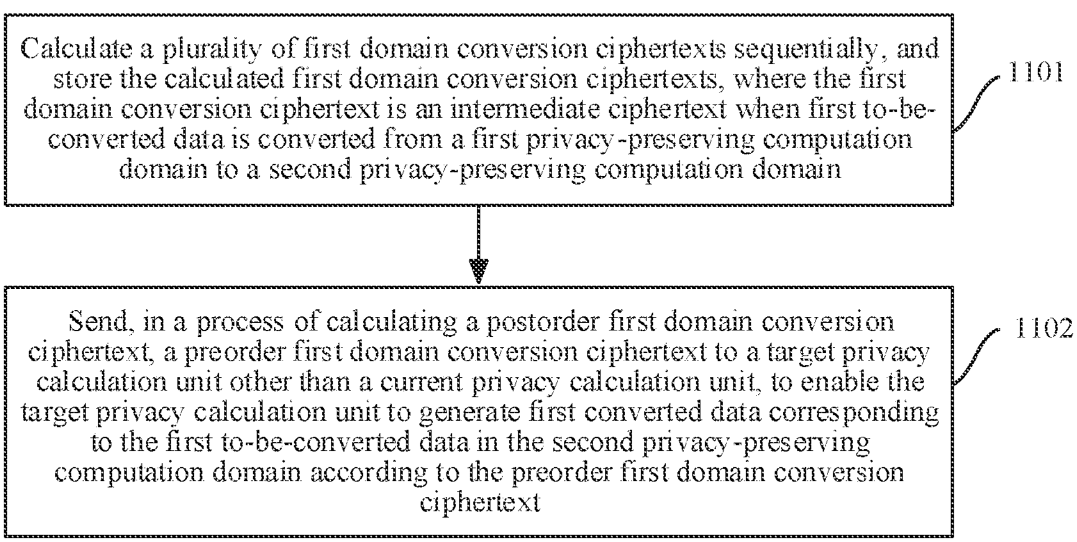
FIG. 11 is a flowchart of an example privacy calculation method according to some embodiments of the present disclosure.

FIG. 11 is a flowchart of a privacy calculation method according to some embodiments of the present disclosure. The privacy calculation method may be performed by the privacy calculation unit 162 in any foregoing embodiments. As shown in FIG. 11, the privacy calculation method includes the following steps.

In step 1101, a plurality of first domain conversion ciphertexts are calculated sequentially, and the calculated first domain conversion ciphertexts are stored. The first domain conversion ciphertext is an intermediate ciphertext when first to-be-converted data is converted from a first privacy-preserving computation domain to a second privacy-preserving computation domain.

In step 1102, in a process in which a postorder first domain conversion ciphertext is calculated, a preorder first domain conversion ciphertext is sent to a target privacy calculation unit other than the current privacy calculation unit, to enable the target privacy calculation unit to generate first converted data corresponding to the first to-be-converted data in the second privacy-preserving computation domain according to the preorder first domain conversion ciphertext.

In some embodiments of the present disclosure, the plurality of first domain conversion ciphertexts are calculated sequentially, and the calculated first domain conversion ciphertexts are stored. In the process of calculating the postorder first domain conversion ciphertext, the preorder first domain conversion ciphertext is sent to the target privacy calculation unit, so that the calculation process of the postorder first domain conversion ciphertext at least partially overlaps with the sending process of the preorder first domain conversion ciphertext, and there is no need to wait for the preorder domain conversion ciphertext to be sent to a target calculation apparatus before starting to calculate the postorder domain conversion ciphertext, thereby reducing at least part of the time for sending the domain conversion ciphertext to the target calculation apparatus. Therefore, for a privacy-preserving computation scenario, such as privacy-preserving machine learning, that requires a batch of privacy-preserving computation domain conversion, the efficiency of privacy-preserving computation can be improved.

It should be noted that, because details of the privacy calculation method have been described in detail in combination with the structural schematic diagram in the foregoing embodiments of the privacy calculation unit, for the specific process, the reference may be made to the description in the foregoing embodiments of the privacy calculation unit, and thus details are not repeated herein.

Example electronic devices according to some embodiments of the present disclosure will be discussed below.

Figure 12:
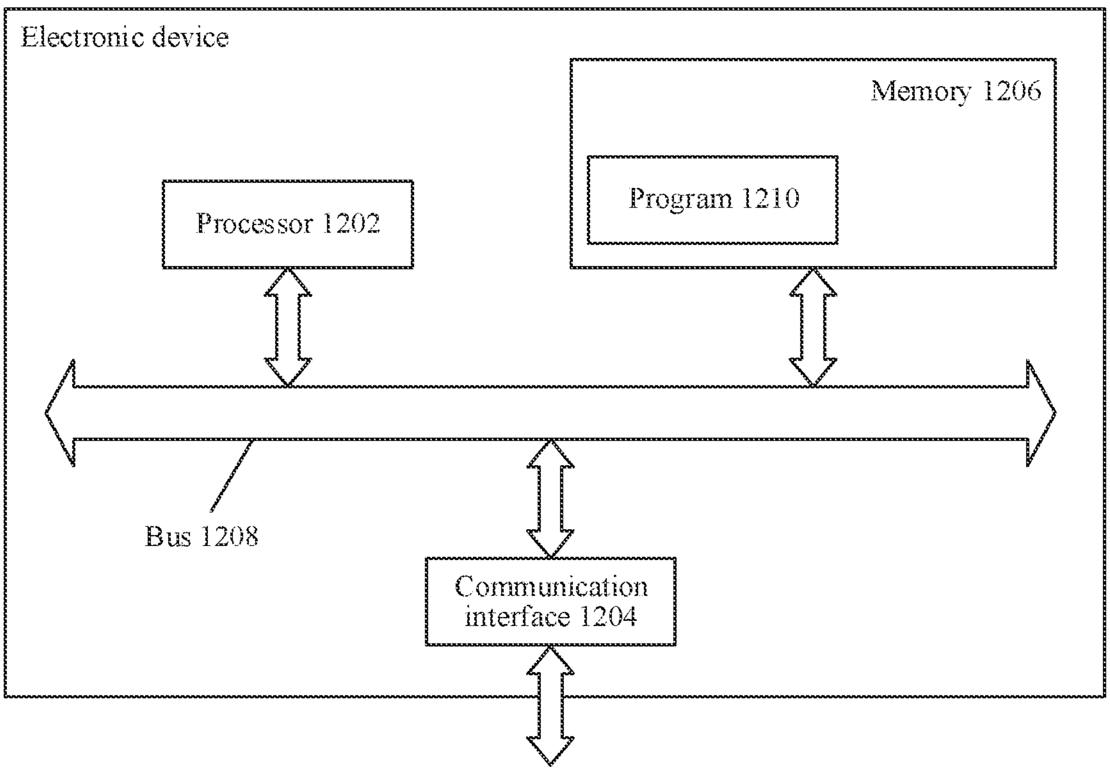
FIG. 12 is a schematic diagram of an example electronic device according to some embodiments of the present disclosure.

FIG. 12 is a schematic diagram of an electronic device according to some embodiments of the present disclosure, but the specific embodiments of the present disclosure are not meant to limit the specific implementations of the electronic device. As shown in FIG. 12, the electronic device may include: a processor 1202, a communication interface 1204, a memory 1206, and a communication bus 1208.

Communication among the processor 1202, the communication interface 1204, and the memory 1206 can be implemented through the communication bus 1208.

The communication interface 1204 is configured to communicate with another electronic device or server.

The processor 1202 is configured to execute a program 1210, and specifically, may perform corresponding steps in any foregoing embodiments of the privacy calculation methods.

Specifically, the program 1210 may include program codes, and the program codes include a computer operation instruction.

The processor 1202 can be a CPU, or an application specific integrated circuit (ASIC), or may be configured as one or more integrated circuits in some embodiments of the present disclosure. One or more processors included in a smart device may be processors of the same type, for example, one or more CPUs, or may be processors of different types, for example, one or more CPUs and one or more ASICs.

RISC-V is an open source instruction set architecture based on a reduced instruction set computer (RISC) principle, may be applied to various aspects such as a single-chip microcomputer and an FPGA chip, and may be specifically used in the field such as Internet of Things security, industrial control, mobile phones, or personal computers. In addition, because the design considers the practical conditions of the small size, the high speed, and the low power consumption, the RISC-V is especially suitable for modern computation devices such as warehouse-scale cloud computers, high-end mobile phones, or micro embedded systems. With the rise of artificial intelligence of things (AIoT), the RISC-V instruction set architecture also gains more and more attention and support, and is expected to become the widely used CPU architecture in the next generation.

The computer operation instruction in some embodiments of the present disclosure may be a computer operation instruction based on the RISC-V instruction set architecture. Correspondingly, the processor 1202 may be designed based on the RISC-V instruction set. Specifically, a chip of the processor in the electronic device provided in some embodiments of the present disclosure may be a chip designed using the RISC-V instruction set. The chip may execute executable code based on the configured instruction, thereby implementing the privacy calculation method in the foregoing embodiments.

The memory 1206 is configured to store the program 1210. The memory 1206 may include a high-speed RAM memory, or may further include a non-volatile memory, for example, at least one magnetic disk memory.

Specifically, the program 1210 may be configured to enable the processor 1202 to perform the privacy calculation method in any foregoing embodiments.

For specific implementations of steps in the program 1210, the reference may be made to corresponding description of corresponding steps and units in any foregoing embodiments of privacy calculation methods, and details are not repeated herein. It can be clearly understood by a person skilled in the art that, for the purpose of convenient and brief description, for the detailed working process of the foregoing devices and modules, the reference may be made to the corresponding process in the foregoing method embodiments, and details are not repeated herein.

Through the electronic devices disclosed in embodiments of the present disclosure, the plurality of first domain conversion ciphertexts are calculated sequentially, and the calculated first domain conversion ciphertexts are stored. In the process of calculating the postorder first domain conversion ciphertext, the preorder first domain conversion ciphertext is sent to the target privacy calculation unit, so that the calculation process of the postorder first domain conversion ciphertext at least partially overlaps with the sending process of the preorder first domain conversion ciphertext, and there is no need to wait for the preorder domain conversion ciphertext to be sent to a target calculation apparatus before starting to calculate the postorder domain conversion ciphertext, thereby reducing at least part of the time for sending the domain conversion ciphertext to the target calculation apparatus. Therefore, for a privacy-preserving computation scenario, such as privacy-preserving machine learning, that requires a batch of privacy-preserving computation domain conversion, the efficiency of privacy-preserving computation can be improved.

Example computer storage media according to some embodiments of the present disclosure will be discussed below.

The present disclosure further provides a computer-readable storage medium storing instructions for enabling a machine to perform the privacy calculation methods described in the embodiments of the disclosure. Specifically, a system or an apparatus that is equipped with a storage medium may be provided. The storage medium stores software program codes that implement functions of any embodiment in the foregoing embodiments, and a computer (e.g., a CPU or an MPU) of the system or the apparatus is enabled to read and execute the program codes stored in the storage medium.

In this case, the program codes read from the storage medium can implement the functions in any one of the foregoing embodiments, and therefore the program codes and the storage medium for storing the program code constitute a part of the present disclosure.

Embodiments of the storage medium for providing the program code may include a floppy disk, a hard disk, a magneto-optical disk, an optical memory (such as a CD-ROM, a CD-R, a CD-RW, a DVD-ROM, a DVD-RAM, a DVD-RW, and a DVD+RW), a magnetic tape, a non-volatile storage card, and a ROM. Optionally, the program code may be downloaded from a server computer by using a communication network.

Example computer program products according to some embodiments of the present disclosure will be discussed below.

Some embodiments of the present disclosure further provide a computer program product including computer instructions. The computer instructions are configured to instruct a computer device to perform any corresponding operation(s) in the foregoing method embodiments.

It is appreciated that the present disclosure may be implemented as systems, methods, or computer program products. Therefore, the present disclosure may be specifically implemented in the following forms, e.g., the form of complete hardware, complete software (including firmware, resident software, and micro code), or may be implemented as a combination of hardware and software. In addition, in some embodiments, the present disclosure may further be implemented in a form of one or more computer program products in a computer-readable medium. The computer-readable medium includes computer-readable program code(s).

The computer program product may be any combination of one or more computer-readable media. The computer-readable medium may be a computer-readable signal medium or a computer-readable storage medium. The computer-readable storage medium may be, for example, but not limited to, an electric, magnetic, optical, electromagnetic, infrared, or semi-conductive system, apparatus, or device, or any combination thereof. More specific examples of the computer-readable storage medium include: an electrical connection having one or more wires, a portable computer magnetic disk, a hard disk, a random access memory (RAM), a read-only memory (ROM), an erasable programmable ROM (EPROM or flash memory), an optical fiber, a compact disk ROM (CD-ROM), an optical storage device, a magnetic storage device, or any appropriate combination thereof. In the present disclosure, the computer-readable storage medium may be any tangible medium containing or storing a program, and the program may be used by or used in combination with a processing unit, an apparatus, or a device.

The computer-readable signal medium may include a data signal being in a baseband or transmitted as a part of a carrier, which carries computer-readable program code(s). The propagated data signal may be in a plurality of forms, including but not limited to, an electromagnetic signal, an optical signal, or any other appropriate combination thereof. The computer-readable signal medium may further be any computer-readable medium other than the computer-readable storage medium. The computer-readable medium may send, propagate, or transmit a program that is used by or used in conjunction with an instruction execution system, an apparatus, or a device.

The program code(s) comprised in the computer-readable medium may be transmitted by using any suitable medium, including but not limited to, wireless transmission, a wire, a cable, radio frequency (RF) or the like, or any suitable combination thereof.

The computer program code(s) used for executing the embodiments of the present disclosure may be written by using one or more programming languages or a combination thereof. The programming languages include an object-oriented programming language such as Java and C++, and may also include a conventional procedural programming language such as C. The program code may be completely executed on a user computer, partially executed on a user computer, executed as an independent software package, partially executed on a user computer and partially executed on a remote computer, or completely executed on a remote computer or server. For the case involving a remote computer, the remote computer may be connected to a computer of a user through any type of network including a local area network (LAN) or a wide area network (WAN), or may be connected to an external computer (e.g., through the Internet by using an Internet service provider).

It should be noted that, information (including but not limited to user device information, user personal information, or the like) and data (including but not limited to sample data used for training a model, data used for analysis, stored data, displayed data, or the like) that are involved in some embodiments of the present disclosure and are related to a user are information and data that are authorized by the user or fully authorized by all parties, and the collection, use, and processing of relevant data need to comply with relevant laws, regulations, and standards of relevant countries and regions. In addition, a corresponding operation entrance is provided for the user to choose to authorize or deny.

It can be understood that, the embodiments of this disclosure are described in a progressive manner, for the same or similar parts in the embodiments, the reference can be made to other embodiments, and descriptions of each embodiment focus on the different part(s) from other embodiments. Especially, method embodiments are generally similar to methods described in apparatus embodiments and system embodiments, and therefore are described briefly. For related parts, the reference can be made to partial description in other embodiments.

It should be understood that specific embodiments of the present disclosure are described above. Other embodiments are within the scope of the appended claims. In some cases, the actions or steps recited in the claims may be performed in a different order than in the embodiments and the desired result may still be achieved. In addition, the processes depicted in the accompanying drawings do not necessarily require the particular order shown or sequential order to achieve the desired results. In some embodiments, multitasking and parallel processing are also possible or may be advantageous.

It should be understood that an element described in a singular form herein or displayed only one in the accompanying drawings does not indicate that the element is limited to only one. In addition, modules or elements described or shown as separate herein may be combined into a single module or element, while a module or an element described or shown herein as a single module or element may be split into a plurality of modules or elements.

The embodiments may further be described using the following clauses:

1: A privacy calculation unit, comprising: a first calculation subunit including circuitry configured to calculate a plurality of first domain conversion ciphertexts sequentially, wherein the first domain conversion ciphertext is an intermediate ciphertext when first to-be-converted data is converted from a first privacy-preserving computation domain to a second privacy-preserving computation domain; a storage subunit configured to store the calculated first domain conversion ciphertexts received from the first calculation subunit; and a communication subunit including circuitry configured to send, in a process in which the first calculation subunit calculates a postorder first domain conversion ciphertext, a preorder first domain conversion ciphertext to a target privacy calculation unit other than the current privacy calculation unit and to enable the target privacy calculation unit to generate first converted data corresponding to the first to-be-converted data in the second privacy-preserving computation domain according to the preorder first domain conversion ciphertext.

2: The privacy calculation unit as paragraph 1 describes, wherein the first privacy-preserving computation domain is a homomorphic encryption domain, and the second privacy-preserving computation domain is a secret sharing domain, or the first privacy-preserving computation domain is the secret sharing domain, and the second privacy-preserving computation domain is the homomorphic encryption domain.

3: The privacy calculation unit as paragraph 2 describes, wherein when the first privacy-preserving computation domain is the homomorphic encryption domain, and the second privacy-preserving computation domain is the secret sharing domain, the first calculation subunit includes circuitry configured to obtain a random shared value, and calculate the first domain conversion ciphertexts according to the random shared value and the first to-be-converted data, to enable the target privacy calculation unit to decrypt the first domain conversion ciphertexts based on a private key of the target privacy calculation unit, to obtain the first converted data corresponding to the first to-be-converted data in the secret sharing domain, wherein the current privacy calculation unit uses the random shared value as an output, and the target privacy calculation unit uses the first converted data as an output.

4: The privacy calculation unit as paragraph 3 describes, wherein the privacy calculation unit further comprises: a pseudo-random number generation subunit including circuitry configured to generate a pseudo-random number according to a preset clock frequency; and a cache subunit configured to cache the generated pseudo-random number received from the pseudo-random number generation subunit, wherein the first calculation subunit includes circuitry configured to read the pseudo-random number from the cache subunit as the random shared value.

5: The privacy calculation unit as paragraphs 3 or 4 describes, wherein the first calculation subunit includes circuitry configured to calculate the postorder first domain conversion ciphertext after calculating the preorder first domain conversion ciphertext, and the storage subunit stores the preorder first domain conversion ciphertext received from the first calculation subunit.

6: The privacy calculation unit as any of paragraphs 2-5 describes, wherein when the first privacy-preserving computation domain is the secret sharing domain, and the second privacy-preserving computation domain is the homomorphic encryption domain, the first calculation subunit includes circuitry configured to read the first to-be-converted data from the storage subunit, and perform homomorphic encryption on the first to-be-converted data based on a public key of the current privacy calculation unit, to obtain the first domain conversion ciphertexts, to enable the target privacy calculation unit to calculate, according to the first domain conversion ciphertexts and a first homomorphic ciphertext obtained by performing homomorphic encryption on second to-be-converted data corresponding to the first to-be-converted data based on the public key of the current privacy calculation unit, the first converted data corresponding to the first to-be-converted data and the second to-be-converted data in the homomorphic encryption domain, wherein the current privacy calculation unit has no output, and the target privacy calculation unit uses the first converted data as an output.

7: The privacy calculation unit as paragraph 6 describes, wherein the first calculation subunit includes circuitry configured to read, before calculating the preorder first domain conversion ciphertext, the first to-be-converted data corresponding to the postorder first domain conversion ciphertext from the storage subunit, to calculate, after calculating the preorder first domain conversion ciphertext, the postorder first domain conversion ciphertext, and to store the preorder first domain conversion ciphertext into the storage subunit.

8: The privacy calculation unit as any of paragraphs 2-7 describes, wherein the communication subunit includes circuitry configured to receive a second domain conversion ciphertext from a first source privacy calculation unit other than the current privacy calculation unit, and store the second domain conversion ciphertext into the storage subunit, wherein the second domain conversion ciphertext is an intermediate ciphertext when third to-be-converted data is converted from the homomorphic encryption domain to the secret sharing domain, and the second domain conversion ciphertext is calculated by the first source privacy calculation unit based on a generated random shared value and the third to-be-converted data; and the first calculation subunit includes circuitry configured to decrypt the second domain conversion ciphertext based on a private key of the current privacy calculation unit, to obtain second converted data corresponding the third to-be-converted data in the secret sharing domain.

9: The privacy calculation unit as paragraph 8 describes, wherein the first calculation subunit is configured to read, before completing decryption on a preorder second domain conversion ciphertext, a postorder second domain conversion ciphertext from the storage subunit, to decrypt the postorder second domain conversion ciphertext after completing the decryption on the preorder second domain conversion ciphertext.

10: The privacy calculation unit as any of paragraphs 2-9 describes, wherein the communication subunit includes circuitry configured to receive a third domain conversion ciphertext from a second source privacy calculation unit other than the current privacy calculation unit, and store the third domain conversion ciphertext into the storage subunit, wherein the third domain conversion ciphertext is an intermediate ciphertext when fourth to-be-converted data and corresponding fifth to-be-converted data are converted from the secret sharing domain to the homomorphic encryption domain, and the third domain conversion ciphertext is obtained through homomorphic encryption performed by the second source privacy calculation unit on the fourth to-be-converted data based on a public key of the second source privacy calculation unit; and the first calculation subunit includes circuitry configured to read the third domain conversion ciphertext and the fifth to-be-converted data from the storage subunit, and perform homomorphic encryption on the fifth to-be-converted data based on a public key of the current privacy calculation unit, to obtain a second homomorphic ciphertext, and calculate third converted data corresponding to the fourth to-be-converted data and the fifth to-be-converted data in the homomorphic encryption domain according to the second homomorphic ciphertext and the third domain conversion ciphertext.

11: The privacy calculation unit as paragraph 10 describes, wherein the first calculation subunit includes circuitry configured to read, before the communication subunit receives the third domain conversion ciphertext, the fifth to-be-converted data from the storage subunit, and perform homomorphic encryption on the fifth to-be-converted data based on the public key of the current privacy calculation unit, to obtain the second homomorphic ciphertext.

12: The privacy calculation unit as any of paragraphs 1-11 describes, wherein the privacy calculation unit further comprises a second calculation subunit, wherein the first calculation subunit includes circuitry configured to calculate data in a homomorphic encryption domain, and the second calculation subunit includes circuitry configured to calculate data in a secret sharing domain.

13: A privacy calculation method, applied to a current privacy calculation unit, the privacy calculation method comprising: calculating a plurality of first domain conversion ciphertexts sequentially, and storing the calculated first domain conversion ciphertexts, wherein the first domain conversion ciphertext is an intermediate ciphertext when first to-be-converted data is converted from a first privacy-preserving computation domain to a second privacy-preserving computation domain; and sending, in a process in which a postorder first domain conversion ciphertext is calculated, a preorder first domain conversion ciphertext to a target privacy calculation unit other than the current privacy calculation unit, to enable the target privacy calculation unit to generate first converted data corresponding to the first to-be-converted data in the second privacy-preserving computation domain according to the preorder first domain conversion ciphertext.

14: The privacy calculation method as paragraph 13 describes, wherein the first privacy-preserving computation domain is a homomorphic encryption domain, and the second privacy-preserving computation domain is a secret sharing domain, or the first privacy-preserving computation domain is the secret sharing domain, and the second privacy-preserving computation domain is the homomorphic encryption domain.

15: The privacy calculation method as paragraph 14 describes, further comprising: when the first privacy-preserving computation domain is the homomorphic encryption domain, and the second privacy-preserving computation domain is the secret sharing domain, performing: obtaining a random shared value; and calculating the first domain conversion ciphertexts according to the random shared value and the first to-be-converted data, to enable the target privacy calculation unit to decrypt the first domain conversion ciphertexts based on a private key of the target privacy calculation unit, to obtain the first converted data corresponding to the first to-be-converted data in the secret sharing domain, wherein the current privacy calculation unit uses the random shared value as an output, and the target privacy calculation unit uses the first converted data as an output.

16: The privacy calculation method as paragraph 15 describes, further comprising: generating a pseudo-random number according to a preset clock frequency and caching the generated pseudo-random number into a cache subunit; and reading the pseudo-random number from the cache subunit as the random shared value.

17: The privacy calculation method as paragraphs 15 or 16 describes, further comprising: calculating the postorder first domain conversion ciphertext after calculating the preorder first domain conversion ciphertext; and storing the preorder first domain conversion ciphertext.

18: The privacy calculation method as any of paragraphs 14-17 describes, further comprising: when the first privacy-preserving computation domain is the secret sharing domain, and the second privacy-preserving computation domain is the homomorphic encryption domain, performing: reading the first to-be-converted data; and performing homomorphic encryption on the first to-be-converted data based on a public key of the current privacy calculation unit, to obtain the first domain conversion ciphertexts, to enable the target privacy calculation unit to calculate, according to the first domain conversion ciphertexts and a first homomorphic ciphertext obtained by performing homomorphic encryption on second to-be-converted data corresponding to the first to-be-converted data based on the public key of the current privacy calculation unit, the first converted data corresponding to the first to-be-converted data and the second to-be-converted data in the homomorphic encryption domain, wherein the current privacy calculation unit has no output, and the target privacy calculation unit uses the first converted data as an output.

19: The privacy calculation method as paragraph 18 describes, further comprising: reading, before calculating the preorder first domain conversion ciphertext, the first to-be-converted data corresponding to the postorder first domain conversion ciphertext, to calculate the postorder first domain conversion ciphertext after calculating the preorder first domain conversion ciphertext; and storing the preorder first domain conversion ciphertext.

20: The privacy calculation method as any of paragraphs 14-19 describes, further comprising: receiving a second domain conversion ciphertext from a first source privacy calculation unit other than the current privacy calculation unit; storing the second domain conversion ciphertext, wherein the second domain conversion ciphertext is an intermediate ciphertext when third to-be-converted data is converted from the homomorphic encryption domain to the secret sharing domain, and the second domain conversion ciphertext is calculated by the first source privacy calculation unit based on a generated random shared value and the third to-be-converted data; and decrypting the second domain conversion ciphertext based on a private key of the current privacy calculation unit, to obtain second converted data corresponding the third to-be-converted data in the secret sharing domain.

21: The privacy calculation method as any of paragraph 20 describes, further comprising: reading, before completing decryption on a preorder second domain conversion ciphertext, a postorder second domain conversion ciphertext, to decrypt the postorder second domain conversion ciphertext after completing the decryption on the preorder second domain conversion ciphertext.

22: The privacy calculation method as any of paragraphs 14-21 describes, further comprising: receiving a third domain conversion ciphertext from a second source privacy calculation unit other than the current privacy calculation unit; and storing the third domain conversion ciphertext, wherein the third domain conversion ciphertext is an intermediate ciphertext when fourth to-be-converted data and corresponding fifth to-be-converted data are converted from the secret sharing domain to the homomorphic encryption domain, and the third domain conversion ciphertext is obtained through homomorphic encryption performed by the second source privacy calculation unit on the fourth to-be-converted data based on a public key of the second source privacy calculation unit; reading the third domain conversion ciphertext and the fifth to-be-converted data; performing homomorphic encryption on the fifth to-be-converted data based on a public key of the current privacy calculation unit, to obtain a second homomorphic ciphertext; and calculating third converted data corresponding to the fourth to-be-converted data and the fifth to-be-converted data in the homomorphic encryption domain according to the second homomorphic ciphertext and the third domain conversion ciphertext.

23: The privacy calculation method as paragraph 22 describes, further comprising: reading, before a communication subunit receives the third domain conversion ciphertext, the fifth to-be-converted data; and performing homomorphic encryption on the fifth to-be-converted data based on the public key of the current privacy calculation unit, to obtain the second homomorphic ciphertext.

24: The privacy calculation method as any of paragraphs 13-23 describes, further comprising: calculate data in a homomorphic encryption domain by a first calculation subunit; and calculate data in a secret sharing domain by a second calculation subunit.

25: A non-transitory computer-readable storage medium storing a program that is executable by a device to cause the device to perform operations of a privacy calculation method, the operations comprising: calculating a plurality of first domain conversion ciphertexts sequentially, and storing the calculated first domain conversion ciphertexts, wherein the first domain conversion ciphertext is an intermediate ciphertext when first to-be-converted data is converted from a first privacy-preserving computation domain to a second privacy-preserving computation domain; and sending, in a process in which a postorder first domain conversion ciphertext is calculated, a preorder first domain conversion ciphertext to a target privacy calculation unit other than the current privacy calculation unit, to enable the target privacy calculation unit to generate first converted data corresponding to the first to-be-converted data in the second privacy-preserving computation domain according to the preorder first domain conversion ciphertext.

26: The non-transitory computer-readable storage medium as paragraph 25 describes, wherein the first privacy-preserving computation domain is a homomorphic encryption domain, and the second privacy-preserving computation domain is a secret sharing domain, or the first privacy-preserving computation domain is the secret sharing domain, and the second privacy-preserving computation domain is the homomorphic encryption domain.

27: The non-transitory computer-readable storage medium as paragraph 26 describes, wherein the operations further comprise: when the first privacy-preserving computation domain is the homomorphic encryption domain, and the second privacy-preserving computation domain is the secret sharing domain, performing: obtaining a random shared value; and calculating the first domain conversion ciphertexts according to the random shared value and the first to-be-converted data, to enable the target privacy calculation unit to decrypt the first domain conversion ciphertexts based on a private key of the target privacy calculation unit, to obtain the first converted data corresponding to the first to-be-converted data in the secret sharing domain, wherein the current privacy calculation unit uses the random shared value as an output, and the target privacy calculation unit uses the first converted data as an output.

28: The non-transitory computer-readable storage medium as paragraph 27 describes, wherein the operations further comprise: generating a pseudo-random number according to a preset clock frequency and caching the generated pseudo-random number into a cache subunit; and reading the pseudo-random number from the cache subunit as the random shared value.

29: The non-transitory computer-readable storage medium as paragraphs 27 or 28 describes, wherein the operations further comprise: calculating the postorder first domain conversion ciphertext after calculating the preorder first domain conversion ciphertext; and storing the preorder first domain conversion ciphertext.

30: The non-transitory computer-readable storage medium as any of paragraphs 26-29 describes, wherein the operations further comprise: when the first privacy-preserving computation domain is the secret sharing domain, and the second privacy-preserving computation domain is the homomorphic encryption domain, performing: reading the first to-be-converted data; and performing homomorphic encryption on the first to-be-converted data based on a public key of the current privacy calculation unit, to obtain the first domain conversion ciphertexts, to enable the target privacy calculation unit to calculate, according to the first domain conversion ciphertexts and a first homomorphic ciphertext obtained by performing homomorphic encryption on second to-be-converted data corresponding to the first to-be-converted data based on the public key of the current privacy calculation unit, the first converted data corresponding to the first to-be-converted data and the second to-be-converted data in the homomorphic encryption domain, wherein the current privacy calculation unit has no output, and the target privacy calculation unit uses the first converted data as an output.

31: The non-transitory computer-readable storage medium as paragraph 30 describes, wherein the operations further comprise: reading, before calculating the preorder first domain conversion ciphertext, the first to-be-converted data corresponding to the postorder first domain conversion ciphertext, to calculate the postorder first domain conversion ciphertext after calculating the preorder first domain conversion ciphertext; and storing the preorder first domain conversion ciphertext.

32: The non-transitory computer-readable storage medium as any of paragraphs 26-31 describes, wherein the operations further comprise: receiving a second domain conversion ciphertext from a first source privacy calculation unit other than the current privacy calculation unit; storing the second domain conversion ciphertext, wherein the second domain conversion ciphertext is an intermediate ciphertext when third to-be-converted data is converted from the homomorphic encryption domain to the secret sharing domain, and the second domain conversion ciphertext is calculated by the first source privacy calculation unit based on a generated random shared value and the third to-be-converted data; and decrypting the second domain conversion ciphertext based on a private key of the current privacy calculation unit, to obtain second converted data corresponding the third to-be-converted data in the secret sharing domain.

33: The non-transitory computer-readable storage medium as paragraph 32 describes, wherein the operations further comprise: reading, before completing decryption on a preorder second domain conversion ciphertext, a postorder second domain conversion ciphertext, to decrypt the postorder second domain conversion ciphertext after completing the decryption on the preorder second domain conversion ciphertext.

34: The non-transitory computer-readable storage medium as any of paragraphs 26-33 describes, wherein the operations further comprise: receiving a third domain conversion ciphertext from a second source privacy calculation unit other than the current privacy calculation unit; and storing the third domain conversion ciphertext, wherein the third domain conversion ciphertext is an intermediate ciphertext when fourth to-be-converted data and corresponding fifth to-be-converted data are converted from the secret sharing domain to the homomorphic encryption domain, and the third domain conversion ciphertext is obtained through homomorphic encryption performed by the second source privacy calculation unit on the fourth to-be-converted data based on a public key of the second source privacy calculation unit; reading the third domain conversion ciphertext and the fifth to-be-converted data; performing homomorphic encryption on the fifth to-be-converted data based on a public key of the current privacy calculation unit, to obtain a second homomorphic ciphertext; and calculating third converted data corresponding to the fourth to-be-converted data and the fifth to-be-converted data in the homomorphic encryption domain according to the second homomorphic ciphertext and the third domain conversion ciphertext.

35: The non-transitory computer-readable storage medium as paragraph 34 describes, wherein the operations further comprise: reading, before a communication subunit receives the third domain conversion ciphertext, the fifth to-be-converted data; and performing homomorphic encryption on the fifth to-be-converted data based on the public key of the current privacy calculation unit, to obtain the second homomorphic ciphertext.

36: The non-transitory computer-readable storage medium as any of paragraphs 25-35 describes, wherein the operations further comprise: calculate data in a homomorphic encryption domain by a first calculation subunit; and calculate data in a secret sharing domain by a second calculation subunit.

37: An acceleration unit, comprising: a privacy calculation unit comprising: a first calculation subunit including circuitry configured to calculate a plurality of first domain conversion ciphertexts sequentially, wherein the first domain conversion ciphertext is an intermediate ciphertext when first to-be-converted data is converted from a first privacy-preserving computation domain to a second privacy-preserving computation domain; a storage subunit configured to store the calculated first domain conversion ciphertexts received from the first calculation subunit; and a communication subunit including circuitry configured to send, in a process in which the first calculation subunit calculates a postorder first domain conversion ciphertext, a preorder first domain conversion ciphertext to a target privacy calculation unit other than the current privacy calculation unit, to enable the target privacy calculation unit to generate first converted data corresponding to the first to-be-converted data in the second privacy-preserving computation domain according to the preorder first domain conversion ciphertext; and a control unit including circuitry configured to control operation of the privacy calculation unit.

38: A system on chip, comprising: an acceleration unit, comprising: a privacy calculation unit comprising: a first calculation subunit including circuitry configured to calculate a plurality of first domain conversion ciphertexts sequentially, wherein the first domain conversion ciphertext is an intermediate ciphertext when first to-be-converted data is converted from a first privacy-preserving computation domain to a second privacy-preserving computation domain; a storage subunit configured to store the calculated first domain conversion ciphertexts received from the first calculation subunit; and a communication subunit including circuitry configured to send, in a process in which the first calculation subunit calculates a postorder first domain conversion ciphertext, a preorder first domain conversion ciphertext to a target privacy calculation unit other than the current privacy calculation unit, to enable the target privacy calculation unit to generate first converted data corresponding to the first to-be-converted data in the second privacy-preserving computation domain according to the preorder first domain conversion ciphertext; and a control unit including circuitry configured to control operation of the privacy calculation unit.

39: A computer device, comprising: a memory configured to store a computer program; and one or more processors configured to run the computer program stored in the memory, to cause the computer device to execute operations of a privacy calculation method, the operations comprising: calculating a plurality of first domain conversion ciphertexts sequentially, and storing the calculated first domain conversion ciphertexts, wherein the first domain conversion ciphertext is an intermediate ciphertext when first to-be-converted data is converted from a first privacy-preserving computation domain to a second privacy-preserving computation domain; and sending, in a process in which a postorder first domain conversion ciphertext is calculated, a preorder first domain conversion ciphertext to a target privacy calculation unit other than the current privacy calculation unit, to enable the target privacy calculation unit to generate first converted data corresponding to the first to-be-converted data in the second privacy-preserving computation domain according to the preorder first domain conversion ciphertext.

It should also be understood that the terms and expression manners used herein are merely for description, and one or more embodiments of the present disclosure should not be limited to these terms and expressions. The use of these terms and expressions does not mean to exclude any equivalent features of the illustration and description (or part of them), and it should be understood that various modifications that may exist should also be within the scope of claims. Other modifications, changes, and replacements may also exist. Accordingly, the claims should be considered as covering all these equivalents.

What is claimed is:

1. A privacy calculation unit, comprising:

a first calculation subunit including circuitry configured to calculate a plurality of first domain conversion ciphertexts sequentially, wherein each of the first domain conversion ciphertexts is an intermediate ciphertext when first to-be-converted data is converted from a first privacy-preserving computation domain to a second privacy-preserving computation domain;

a storage subunit including circuitry configured to store the calculated first domain conversion ciphertexts received from the first calculation subunit; and a communication subunit including circuitry configured to send, in a process in which the first calculation subunit calculates a postorder first domain conversion ciphertext, a preorder first domain conversion ciphertext to a target privacy calculation unit other than the current privacy calculation unit and to enable the target privacy calculation unit to generate first converted data corresponding to the first to-be-converted data in the second privacy-preserving computation domain according to the preorder first domain conversion ciphertext, wherein when the first privacy-preserving computation domain is a secret sharing domain, and the second privacy-preserving computation domain is a homomorphic encryption domain, the first calculation subunit includes circuitry configured to perform homomorphic encryption on the first to-be-converted data based on a public key of the current privacy calculation unit, to obtain the first domain conversion ciphertexts, to enable the target privacy calculation unit to calculate the first converted data corresponding to the first to-be-converted data and second to-be-converted data in the homomorphic encryption domain.

2. The privacy calculation unit of claim 1, wherein the first privacy-preserving computation domain is the homomorphic encryption domain, and the second privacy-preserving computation domain is the secret sharing domain, or the first privacy-preserving computation domain is the secret sharing domain, and the second privacy-preserving computation domain is the homomorphic encryption domain.

3. The privacy calculation unit of claim 2, wherein when the first privacy-preserving computation domain is the homomorphic encryption domain, and the second privacy-preserving computation domain is the secret sharing domain, the first calculation subunit includes circuitry configured to obtain a random shared value, and calculate the first domain conversion ciphertexts according to the random shared value and the first to-be-converted data, to enable the target privacy calculation unit to decrypt the first domain conversion ciphertexts based on a private key of the target privacy calculation unit, to obtain the first converted data corresponding to the first to-be-converted data in the secret sharing domain, wherein the current privacy calculation unit uses the random shared value as an output, and the target privacy calculation unit uses the first converted data as an output.

4. The privacy calculation unit of claim 3, wherein the privacy calculation unit further comprises:

a pseudo-random number generation subunit including circuitry configured to generate a pseudo-random number according to a preset clock frequency; and a cache configured to cache the generated pseudo-random number received from the pseudo-random number generation subunit, wherein the first calculation subunit includes circuitry configured to read the pseudo-random number from the cache as the random shared value.

5. The privacy calculation unit of claim 3, wherein the first calculation subunit includes circuitry configured to calculate the postorder first domain conversion ciphertext after calculating the preorder first domain conversion ciphertext, and the storage subunit stores the preorder first domain conversion ciphertext received from the first calculation subunit.

6. The privacy calculation unit of claim 1, wherein when the first privacy-preserving computation domain is the secret sharing domain, and the second privacy-preserving computation domain is the homomorphic encryption domain, the first calculation subunit includes circuitry configured to read the first to-be-converted data from the storage subunit, wherein the first converted data corresponding to the first to-be-converted data and the second to-be-converted data in the homomorphic encryption domain is calculated according to the first domain conversion ciphertexts and a first homomorphic ciphertext obtained by performing homomorphic encryption on the second to-be-converted data corresponding to the first to-be-converted data based on the public key of the current privacy calculation unit, wherein the current privacy calculation unit has no output, and the target privacy calculation unit uses the first converted data as an output.

7. The privacy calculation unit of claim 1, wherein the first calculation subunit includes circuitry configured to read, before calculating the preorder first domain conversion ciphertext, the first to-be-converted data corresponding to the postorder first domain conversion ciphertext from the storage subunit, to calculate, after calculating the preorder first domain conversion ciphertext, the postorder first domain conversion ciphertext, and to store the preorder first domain conversion ciphertext into the storage subunit.

8. The privacy calculation unit of claim 2, wherein the communication subunit includes circuitry configured to receive a second domain conversion ciphertext from a first source privacy calculation unit other than the current privacy calculation unit, and store the second domain conversion ciphertext into the storage subunit, wherein the second domain conversion ciphertext is an intermediate ciphertext when third to-be-converted data is converted from the homomorphic encryption domain to the secret sharing domain, and the second domain conversion ciphertext is calculated by the first source privacy calculation unit based on a generated random shared value and the third to-be-converted data; and the first calculation subunit includes circuitry configured to decrypt the second domain conversion ciphertext based on a private key of the current privacy calculation unit, to obtain second converted data corresponding the third to-be-converted data in the secret sharing domain.

9. The privacy calculation unit of claim 8, wherein the first calculation subunit is configured to read, before completing decryption on a preorder second domain conversion ciphertext, a postorder second domain conversion ciphertext from the storage subunit, to decrypt the postorder second domain conversion ciphertext after completing the decryption on the preorder second domain conversion ciphertext.

10. The privacy calculation unit of claim 2, wherein the communication subunit includes circuitry configured to receive a third domain conversion ciphertext from a second source privacy calculation unit other than the current privacy calculation unit, and store the third domain conversion ciphertext into the storage subunit, wherein the third domain conversion ciphertext is an intermediate ciphertext when fourth to-be-converted data and corresponding fifth to-be-converted data are converted from the secret sharing domain to the homomorphic encryption domain, and the third domain conversion ciphertext is obtained through homomorphic encryption performed by the second source privacy calculation unit on the fourth to-be-converted data based on a public key of the second source privacy calculation unit; and the first calculation subunit includes circuitry configured to read the third domain conversion ciphertext and the fifth to-be-converted data from the storage subunit, and perform homomorphic encryption on the fifth to-be-converted data based on a public key of the current privacy calculation unit, to obtain a second homomorphic ciphertext, and calculate third converted data corresponding to the fourth to-be-converted data and the fifth to-be-converted data in the homomorphic encryption domain according to the second homomorphic ciphertext and the third domain conversion ciphertext.

11. The privacy calculation unit of claim 10, wherein the first calculation subunit includes circuitry configured to read, before the communication subunit receives the third domain conversion ciphertext, the fifth to-be-converted data from the storage subunit, and perform homomorphic encryption on the fifth to-be-converted data based on the public key of the current privacy calculation unit, to obtain the second homomorphic ciphertext.

12. The privacy calculation unit of claim 1, wherein the privacy calculation unit further comprises a second calculation subunit, wherein the first calculation subunit includes circuitry configured to calculate data in a homomorphic encryption domain, and the second calculation subunit includes circuitry configured to calculate data in a secret sharing domain.

13. A privacy calculation method, applied to a current privacy calculation unit, the privacy calculation method comprising:

calculating a plurality of first domain conversion ciphertexts sequentially, and storing the calculated first domain conversion ciphertexts, wherein each of the first domain conversion ciphertexts is an intermediate ciphertext when first to-be-converted data is converted from a first privacy-preserving computation domain to a second privacy-preserving computation domain; and sending, in a process in which a postorder first domain conversion ciphertext is calculated, a preorder first domain conversion ciphertext to a target privacy calculation unit other than the current privacy calculation unit, to enable the target privacy calculation unit to generate first converted data corresponding to the first to-be-converted data in the second privacy-preserving computation domain according to the preorder first domain conversion ciphertext, when the first privacy-preserving computation domain is the secret sharing domain, and the second privacy-preserving computation domain is the homomorphic encryption domain, performing:

reading the first to-be-converted data; and performing homomorphic encryption on the first to-be-converted data based on a public key of the current privacy calculation unit, to obtain the first domain conversion ciphertexts, to enable the target privacy calculation unit to calculate the first converted data corresponding to the first to-be-converted data and second to-be-converted data in the homomorphic encryption domain.

14. The privacy calculation method of claim 13, wherein the first privacy-preserving computation domain is a homomorphic encryption domain, and the second privacy-preserving computation domain is a secret sharing domain, or the first privacy-preserving computation domain is the secret sharing domain, and the second privacy-preserving computation domain is the homomorphic encryption domain.

15. The privacy calculation method of claim 14, further comprising:

when the first privacy-preserving computation domain is the homomorphic encryption domain, and the second privacy-preserving computation domain is the secret sharing domain, performing:

obtaining a random shared value; and calculating the first domain conversion ciphertexts according to the random shared value and the first to-be-converted data, to enable the target privacy calculation unit to decrypt the first domain conversion ciphertexts based on a private key of the target privacy calculation unit, to obtain the first converted data corresponding to the first to-be-converted data in the secret sharing domain, wherein the current privacy calculation unit uses the random shared value as an output, and the target privacy calculation unit uses the first converted data as an output.

16. The privacy calculation method of claim 15, further comprising:

generating a pseudo-random number according to a preset clock frequency and caching the generated pseudo-random number into a cache; and reading the pseudo-random number from the cache as the random shared value.

17. The privacy calculation method of claim 15, further comprising:

calculating the postorder first domain conversion ciphertext after calculating the preorder first domain conversion ciphertext; and storing the preorder first domain conversion ciphertext.

18. The privacy calculation method of claim 13, wherein:

the first converted data corresponding to the first to-be-converted data and the second to-be-converted data in the homomorphic encryption domain is calculated according to the first domain conversion ciphertexts and a first homomorphic ciphertext obtained by performing homomorphic encryption on second to-be-converted data corresponding to the first to-be-converted data based on the public key of the current privacy calculation unit, wherein the current privacy calculation unit has no output, and the target privacy calculation unit uses the first converted data as an output.

19. The privacy calculation method of claim 13, further comprising:

reading, before calculating the preorder first domain conversion ciphertext, the first to-be-converted data corresponding to the postorder first domain conversion ciphertext, to calculate the postorder first domain conversion ciphertext after calculating the preorder first domain conversion ciphertext; and storing the preorder first domain conversion ciphertext.

20. A non-transitory computer-readable storage medium storing a program that is executable by a device to cause the device to perform operations of a privacy calculation method, the operations comprising:

calculating a plurality of first domain conversion ciphertexts sequentially, and storing the calculated first domain conversion ciphertexts, wherein each of the first domain conversion ciphertexts is an intermediate ciphertext when first to-be-converted data is converted from a first privacy-preserving computation domain to a second privacy-preserving computation domain; and sending, in a process in which a postorder first domain conversion ciphertext is calculated, a preorder first domain conversion ciphertext to a target privacy calculation unit other than the current privacy calculation unit, to enable the target privacy calculation unit to generate first converted data corresponding to the first to-be-converted data in the second privacy-preserving computation domain according to the preorder first domain conversion ciphertext, when the first privacy-preserving computation domain is the secret sharing domain, and the second privacy-preserving computation domain is the homomorphic encryption domain, performing:

reading the first to-be-converted data; and performing homomorphic encryption on the first to-be-converted data based on a public key of the current privacy calculation unit, to obtain the first domain conversion ciphertexts, to enable the target privacy calculation unit to calculate the first converted data corresponding to the first to-be-converted data and second to-be-converted data in the homomorphic encryption domain.

* * * * *